(12) United States Patent
Hawkins

(10) Patent No.: US 7,708,235 B2
(45) Date of Patent: May 4, 2010

(54) MOUNTING DEVICE

(75) Inventor: Patrick A. Hawkins, Plymouth, MN (US)

(73) Assignee: Pipe Pier, Plymouth, MN (US)

( * ) Notice: Subject to any disclaimer, the term of this patent is extended or adjusted under 35 U.S.C. 154(b) by 551 days.

(21) Appl. No.: 11/279,632

(22) Filed: Apr. 13, 2006

(65) Prior Publication Data

US 2007/0057125 A1    Mar. 15, 2007

Related U.S. Application Data

(63) Continuation-in-part of application No. 10/642,960, filed on Aug. 18, 2003, which is a continuation-in-part of application No. 09/843,054, filed on Apr. 26, 2001, now Pat. No. 6,679,461.

(51) Int. Cl.
*F16L 3/08* (2006.01)
(52) U.S. Cl. .................... 248/74.2; 248/74.1; 248/68.1; 248/346.01; 248/346.5; 52/480; 52/167.9; 52/284
(58) Field of Classification Search ................ 248/74.2, 248/74.1, 68.1, 346.5, 346.01; 52/167.9, 52/480, 403.1, 710, 284, 292, 302.1, 167.1
See application file for complete search history.

(56) References Cited

U.S. PATENT DOCUMENTS

| | | | |
|---|---|---|---|
| 1,756,174 A | 4/1930 | Bosco |
| 1,945,332 A | 1/1934 | Robinson |
| 2,909,054 A | 10/1959 | Phillips |
| 3,298,644 A | 1/1967 | Sherburne |
| 3,390,854 A | 7/1968 | Sherburne |
| 3,599,386 A | 8/1971 | LaLonde |
| 3,689,015 A | 9/1972 | Johnson |
| 3,963,205 A | 6/1976 | Hageman |
| 3,968,323 A | 7/1976 | Blanchet |
| 3,980,262 A | 9/1976 | Lee |
| 4,315,393 A | 2/1982 | Schack et al. |
| 4,344,206 A | 8/1982 | Hermanson |
| 4,389,830 A | 6/1983 | Ingeberg |
| 4,502,653 A | 3/1985 | Curtis, Jr. |
| 4,516,296 A | 5/1985 | Sherman |
| 4,542,871 A | 9/1985 | Fortsch |
| 4,638,966 A | 1/1987 | Ford |
| 4,708,554 A | 11/1987 | Howard |
| 4,783,040 A | 11/1988 | Lindberg et al. |

(Continued)

OTHER PUBLICATIONS

"Aickinclamps - Adjustable Pipe Clamps", Product Information from Aickinstrut, (prior to Sep. 1996), 2 pgs.

(Continued)

*Primary Examiner*—J. Allen Shriver
*Assistant Examiner*—Todd M. Epps
(74) *Attorney, Agent, or Firm*—Schwegman, Lundberg & Woessner, P.A.

(57) ABSTRACT

A support device is provided herein and includes a pliable support structure. The support device further includes a plate structure for use with the pliable support structure. The plate structure is disposed on the support structure. A coupling member is associated with the plate structure allowing for other members to be coupled to the support device. Elevating assemblies are optionally further included to elevate elongate structure supported by the support device.

15 Claims, 20 Drawing Sheets

U.S. PATENT DOCUMENTS

| | | | | |
|---|---|---|---|---|
| 4,819,795 | A | * | 4/1989 | Swaney .................... 206/278 |
| 4,826,113 | A | | 5/1989 | Winters |
| 4,961,553 | A | | 10/1990 | Todd |
| 5,141,186 | A | * | 8/1992 | Cusic ........................ 248/73 |
| 5,172,097 | A | | 12/1992 | Arnold |
| 5,217,191 | A | | 6/1993 | Smith |
| 5,418,171 | A | * | 5/1995 | Kimura et al. ............. 436/518 |
| D367,329 | S | | 2/1996 | Nelson et al. |
| 5,855,342 | A | * | 1/1999 | Hawkins et al. ........... 248/68.1 |
| 5,942,347 | A | | 8/1999 | Koncar et al. |
| 5,984,243 | A | * | 11/1999 | Pfaller et al. .............. 248/74.1 |
| 6,305,650 | B1 | | 10/2001 | Hawkins et al. |
| 6,325,352 | B1 | | 12/2001 | Story |
| 6,679,461 | B1 | * | 1/2004 | Hawkins ................... 248/74.2 |
| 6,888,977 | B2 | | 5/2005 | Wong et al. |
| 7,102,089 | B2 | | 9/2006 | Burgess et al. |
| 7,168,210 | B2 | * | 1/2007 | Krovats ..................... 52/167.9 |

OTHER PUBLICATIONS

"U.S. Appl. No. 09/843,054, Response filed Dec. 3, 2002 to Final Office Action mailed Oct. 3, 2002", 5 pgs.

"U.S. Appl. No. 09/843,054, Advisory Action mailed Dec. 23, 2002", 3 pgs.

"U.S. Appl. No. 09/843,054, Final Office Action mailed Oct. 3, 2002", 8 pgs.

"U.S. Appl. No. 09/843,054, Notice of Allowance mailed Jan. 14, 2003", 7 pgs.

"U.S. Appl. No. 09/843,054, Response filed Jul. 17, 2002 to Non-Final Office Action mailed Apr. 17, 2002", 12 pgs.

"U.S. Appl. No. 09/843,054, Non-Final Office Action mailed Apr. 17, 2002", 9 pgs.

"U.S. Appl. No. 10/642,960, Non-Final Office Action mailed Sep. 28, 2006", 9 pgs.

"U.S. Appl. No. 10/642,960, Final Office Action mailed Jul. 27, 2007", 10 pgs.

"U.S. Appl. No. 10/642,960, Non-Final Office Action mailed Apr. 28, 2009", 9 pgs.

"U.S. Appl. No. 10/642,960, Response filed Jan. 28, 2008 to Final Office Action mailed Jul. 27, 2007", 12 pgs.

"U.S. Appl. No. 10/642,960, Response filed Mar. 28, 2007 to Non-Final Office Action mailed Sep. 28, 2006", 13 pgs.

"U.S. Appl. No. 10/642,960, Response filed Apr. 13, 2009 to Final Office Action mailed Nov. 12, 2008", 12 pgs.

"U.S. Appl. No. 10/642,960, Response filed Aug. 11, 2008 to Non-Final Office Action mailed Feb. 11, 2008", 12 pgs.

"U.S. Appl. No. 10/642,960, Response filed Oct. 28, 2009 to Non Final Office Action mailed Apr. 28, 2009", 11 pgs.

"U.S. Appl. No. 10/642,960, Final Office Action mailed Nov. 12, 2008", 11 pgs.

"U.S. Appl. No. 10/642,960, Non-Final Office Action mailed Feb. 11, 2008", 10 pgs.

"Cush-A-Clamp® - Cushion Clamping Systems", Product Brochure from ZSi, Inc., (Mar. 1996), 13 pgs.

"Metal Framing Accessories", Product Information from Aickinstrut, (prior to Sep. 1996), pp. 19.

"O Strut® Engineering Catalog No. 92", Product Information from M-CO®; a Division of Michigan Hangar Co., Inc.®, (1987), 56 pgs.

"Pipe Pier - Flat Roof Pipe Support System", Product Information distributed by Hawkins & Jahnke Associates, Inc., (prior to Sep. 1996), 2 pgs.

"Product Specification Sheet", for product DOWBK-200, from Amcon American Converters, Inc., (Aug. 20, 1996), 1 pg.

"Quick "Pipe" Block - The Labor Saver", Product Information from Nelson Olsen Inc., (prior to Sep. 1996), 2 pgs.

"Roof Pipestands", Product Information from Miro Industries, (prior to Sep. 1996), 4 pgs.

"Specific Specification and Data Sheet: - Floating Anchor Supports", *Product Information, Miro Industries*, [online]. [archived Apr. 27, 2003]. Retrieved from the Internet: <URL:http://web.archive.org/web/20030427170013/www.miroind.com/Spec.+Sheets/Floating+An chor+Supports.htm>, (2003), 2 pgs.

* cited by examiner

MOUNTING DEVICE

RELATED APPLICATIONS

This application is a continuation-in-part of U.S. patent application Ser. No. 10/642,960, filed Aug. 18, 2003, entitled MOUNTING DEVICE, which is a continuation-in-part of U.S. patent application Ser. No. 09/843,054, filed Apr. 26, 2001 (now U.S. Pat. No. 6,679,461), entitled MOUNTING DEVICE, each of which are incorporated herein in their entirety.

TECHNICAL FIELD

The present invention relates generally to mounting of elongate structures. More particularly, it relates to a system for mounting structures on a surface such as a roof of a building.

BACKGROUND

In mounting elongate structures on rooftops, for instance elongate structures such as piping for plumbing, heating, ventilating, and air conditioning, several design considerations are involved, including weight of the elongate structures, and expansion and contraction of the elongate structures. Mounting systems which do not provide a secure attachment or which are not able to support the weight of heavy elongate structures, will damage the roof, and potentially cause leakage and damage to an interior of the building.

Other design considerations for mounting systems include the materials used for the mounting system. Some mounting systems are not durable are more susceptible to deterioration than others, and can only be used in mild climates. For example, snow and rain can deteriorate some mounting structures. Unprotected metal structures may rust and wood mounting structures may rot. In locations where extreme heat or humidity are common, the mounting structures may also deteriorate due to high heat, or wide changes in heat. Once the mounting structure becomes damaged, it is likely to fail to provide adequate support to an elongate structure resulting in damage to the roof.

One attempt at mounting pipes to rooftops has been to use wood mounting blocks located at spaced intervals along the pipe. The pipe is secured to the mounting block and then the entire assembly rests upon the roof. One drawback of the wood mounting bocks is that expansion and contraction of the pipes results in translation of the mounting blocks over the surface of the roof, which is likely to damage the roof. Another disadvantage is that wood mounting structures tend to rot and disintegrate, adding further possibility of damaging the roof. Additionally, different sized wood blocks may be needed for mounting on slightly irregular surfaces, so that the weight of the pipes is distributed to each wood block. Furthermore, the wood blocks are relatively heavy, resulting in difficulties in transporting a large number of them collectively, i.e. on a pallet, up to the roof.

Another attempt at a pipe supporting device is described in U.S. Pat. No. 4,502,653 by Marvin R. Curtis, Jr. This structure has a flat bottom and an upwardly tapered structure with a pocket for positioning a pipe and roller positioned in a receiving trough. As the pipe expands or contracts, it rides on the roller which rotates within the trough, however, this structure does not provide a means to secure the pipe, nor does it provide for lateral motion of the pipe.

Another attempt at mounting pipes is called a QUICK "PIPE" BLOCK by Nelson-Olsen, Inc of Plymouth, Minn. The QUICK "PIPE" BLOCK is a 12"×6"×3.5" high density polyethylene block which rides on a ¾" STYROFOAM pad. A pipe is laid on the rigid block and a metal strap laid over the pipe is attached at each end by inserting fasteners into the rigid block. One disadvantage is that the block uses predrilled holes to receive the fasteners. If the predrilled holes do not provide adequate pipe placement the rigid block must either be drilled again or not used at all, frustrating rapid installation of piping. If the block detaches from the STYROFOAM pad, or the STYROFOAM pad deteriorates, the block may damage a roof due to repeated expansion and contraction of the piping. Another disadvantage is that different sized blocks may be needed for mounting on slightly irregular surfaces, so that the weight of the pipes is distributed to each block. This further frustrates rapid installation of piping. Another disadvantage of this system is that the holes in the rigid block limit the number and type of pipe fasteners which may be used, and the number of pipes which may be mounted to a single block are limited thereby.

Accordingly, there is a need for a mounting system which permits motion of mounted structures, and which permits mounting of relatively heavy mounted structures. What is also needed is a mounting system which protects the mounting surface from damage.

SUMMARY

A mounting device is provided herein and includes a support structure. The support device further includes a plate support disposed on the support structure, where an optional depression of the plate member is disposed at least partially within an optional recess of the support device. An elongate strut is associated with the plate.

Several options for the support device are as follows. For instant, at least one clamp is optionally coupled with the at least one elongate strut. Yet another option is that the support structure comprises foam. The elongate strut is also optionally coupled to the plate member, or formed of portions of the plate member.

The support device is adapted to support elongate structures that are heavier than ordinary elongate structures, and is adapted to support heavy structures on a surface, such as a rooftop, without damage to the surface. A further benefit is that the support structure provides a visual indicator if the support structure needs to be replaced. The support structure allows for elongate structures and/or heavy structures to be mounted on slightly irregular surfaces, and is durable and resilient to harsh weather conditions. Further, the support device provides lateral mounting flexibility and support for the elongate structures and/or the heavy structure, and the elongate structures are allowed to freely change position without damaging the mounting surface, such as a rooftop membrane. The mounting system provides flexibility in mounting structures so that a number of mounts and mounting positions are available, especially for the mounting of more than one structure. The mounting system provides flexibility in mounting structures on slightly irregular surfaces, and is durable and resilient to the weather elements.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1A:
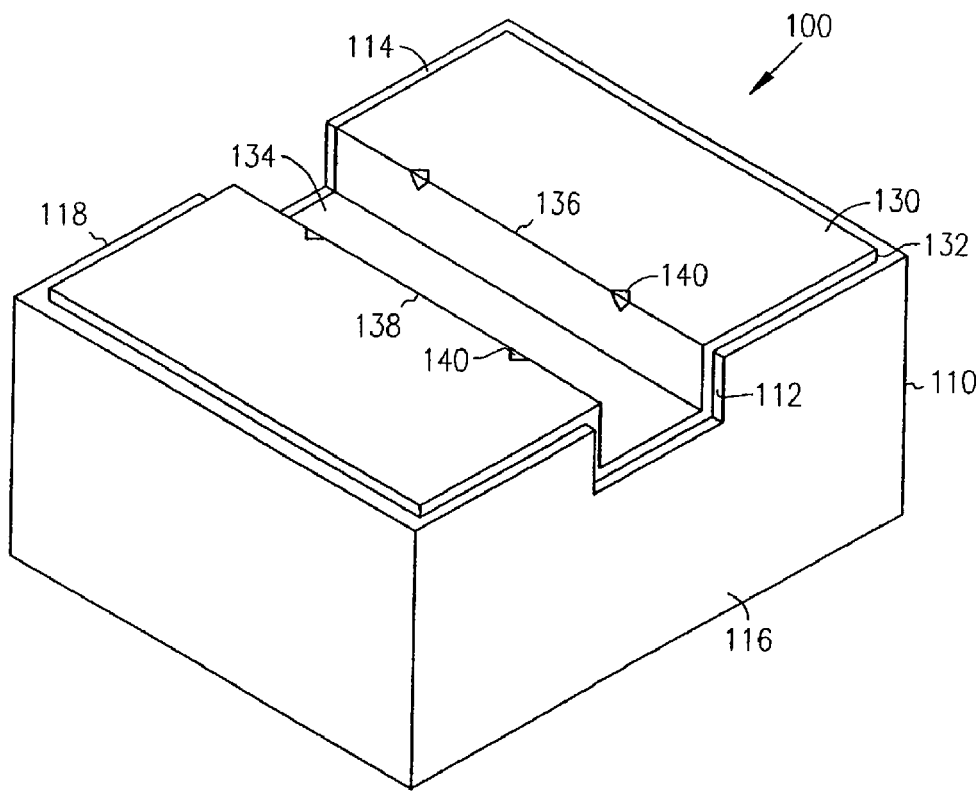
FIG. 1A is a perspective view illustrating a support device constructed in accordance with one embodiment.
Figure 1B:
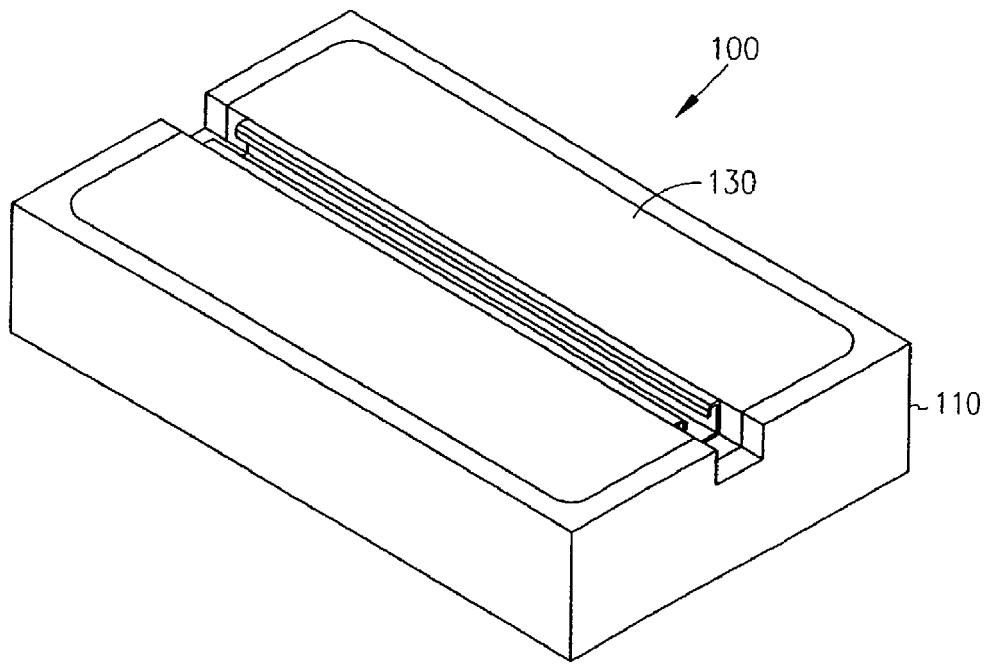
FIG. 1B is a perspective view illustrating a support device constructed in accordance with another embodiment.

FIG. 1A illustrates a perspective view of a support device 100. The support device 100 is adapted to be installed on a roof structure (FIG. 7), and is adapted to support elongate structures, such as piping. In addition, the support device 100 is adapted to support other types of equipment, such as, but not limited to, security cameras, satellite dishes, or air conditioning units. The support device 100 includes a support structure 110 which is adapted to support a plate structure 130 thereon, and, as further discussed below, an elongate strut is included therewith. The support device 100, in one option, has a square footprint. In another option, as shown in FIG. 1B, has a generally rectangular footprint. It should be noted that other shaped footprints, such as a circular footprint, are suitable as well.

In an embodiment, the support structure 110 is made of a pliable material, including, but not limited to, a weather resistant, pliable material. The material has, optionally, a resilience which provides a cushioning effect when compressed. In one embodiment, the support structure 110 comprises a closed cell polyethylene foam material, for example that which is marketed as Dow BK-200. In another embodiment, the support structure 110 comprises fire retardant foam.

The recess 112 is optionally centered in a top surface 114 of the support structure 110, and comprises a structure which has, in one embodiment, a substantially square or rectangular cross-section. The support structure 110 extends from a first side 116 to a second side 118. In one option, the recess 112 extends entirely from the first side 116 to the second side 118. It should be noted however that the recess 112 optionally extends only partially from the first side 116 to the second side 118. Disposed on the support structure 110 is a plate structure 130.

Figure 2:
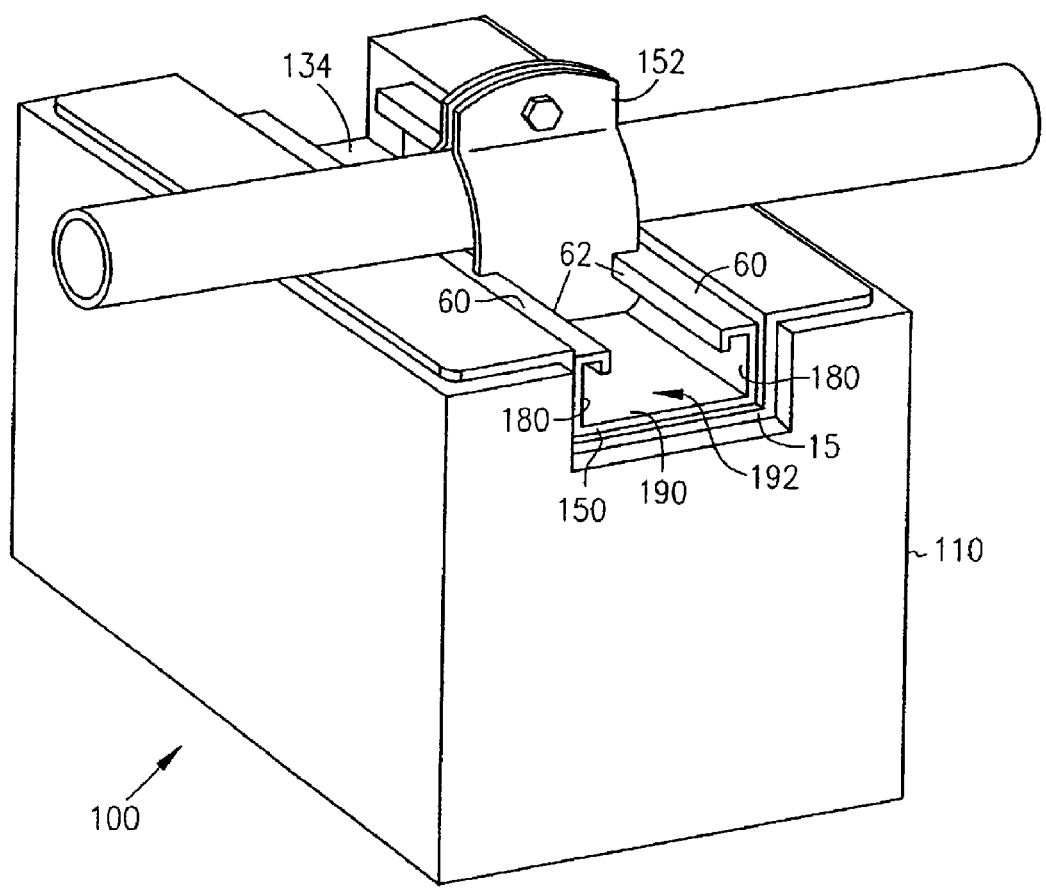
FIG. 2 is a perspective view illustrating a support device constructed in accordance with one embodiment.

The plate structure 130 comprises a generally flat structure, except as described below. The plate structure 130 is coupled with the support structure 110, in a number of manners, for instance, by adhesive or by a mechanical fastener. The plate structure 130 is defined in part by a footprint which is optionally substantially the same as a footprint of the support structure. In another option, the plate structure footprint is smaller that the support structure footprint. The plate structure is further defined in part by corners 132. In one option, one or more of the corners 132 is rounded. The plate structure further includes a depression 134 therein. The depression 134 of the plate structure 130 is sized and positioned to be disposed, at least partially, within the recess 112 of the support structure 110. The depression 134 is optionally deep enough to fully accept a strut therein (FIG. 2). The depression 134 is defined in part by two side edges 136, 138.

In yet another option, the plate structure 130 further includes one or more notches 140 therein. The notches 140 are formed in the plate structure 130, for example, by a break press or a hammer or heat, depending on the material of the plate structure 130. In another embodiment, instead of notches 140, one or more welds are formed in the plate structure 130. The notches 140 are optionally disposed proximate to the depression 134, for instance, on one or both side edges 136, 138. The notches 140 and/or welds beneficially assist in providing rigidity to the plate structure. It should be noted that variations on the notches 140 or welds including size, shape, position, which enhance rigidity are contemplated within the scope of the invention. Optionally, the plate structure 130 is comprised of sheet metal. One example of a suitable sheet metal is 16 gage sheet metal. Other materials for the plate structure 130 are suitable as well, such as, but not limited to 20 gage sheet metal, 12 gage sheet metal, 14 gage sheet metal, or plastic such as nylon, plexiglass, HDPE, or Teflon.

Referring to FIG. 2, the support device 100 further includes at least one elongate strut 150 coupled with the plate structure 130. In one embodiment, the at least one elongate strut 150 is spot welded to the plate structure 130. Other options, although the support device is not limited thereto, include coupling the strut 150 to the plate structure 130 with mechanical devices, and/or adhesive.

Coupled with the at least one elongate strut 150, optionally, is at least one clamp 152. The strut 150 includes a pair of opposed side walls 180 extending upward from a rear wall 190. The pair of opposed side walls 180 and the rear wall 190 define a channel 192 therein, which is adapted to receive clamps for mounting devices, such as elongate piping. The strut 150 further includes a pair of flanges 60 which extend from the side walls 80 toward one another. Each of the flanges 60 includes a lip 62 which defines an opening into the channel 192. The area defined between the side walls 180, flanges 60, and lip 62 is a recess for retaining the clamp 152 when the support devices are installed, as further described in U.S. Pat. No. 5,855,342, which is incorporated by reference herein.

The strut 150 may be of any rigid material, including, but not limited to, steel and plastic. Optionally, the strut is finished or rust proofed using paint or any other finishing or rustproofing, including, but not limited to, galvanization, anodization, hot dipping, and/or electroplating.

The at least one clamp is adapted to support an elongate structure therein or thereon. The types of clamps which can be used with the support device includes, but is not limited to, pipe claims cable clamps, electrical fittings, saddles, brackets, spring bolts, beam clamps, and roller clamps. Alternatively, the clamp comprises a bolt where the bolt head is inserted into the channel with the threaded portion exposed and a nut and plate or strap are used to compress the pipe against the upper surfaces of the flanges 60 of the strut 150.

Figure 3:
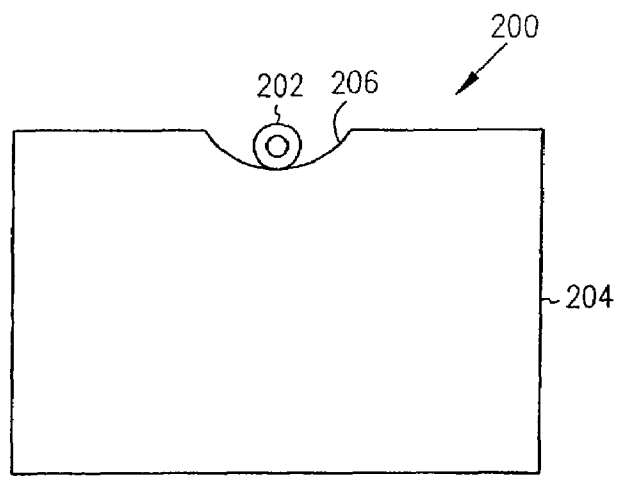
FIG. 3 is a side view illustrating a support device constructed in accordance with another embodiment.

FIG. 3 illustrates a side view of a support device 200. The support device 200 is adapted to be installed on a roof structure (FIG. 7), and is adapted to support elongate structures, such as piping 202. The support device 200 includes a support structure 204 which is adapted to support the elongate structure, such as piping 202, directly thereon. In one embodiment, the support structure 204 is made of a pliable material, including, but not limited to, a weather resistant, pliable material. The pliable material advantageously provides a visual indicator as to whether the support structure 204 has been consumed. The material has, optionally, a resilience which provides a cushioning effect when compressed. In one embodiment, the support structure 204 comprises a closed cell polyethylene foam material, for example that which is marketed as Dow BK-200. The support structure 204 includes a depression 206 therein. In another option, the material has flame retardant properties.

Figure 4A:
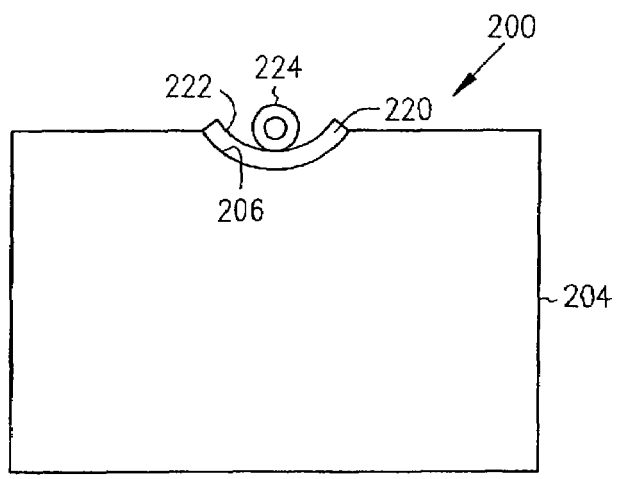
FIG. 4A is a side view illustrating a support device constructed in accordance with another embodiment.
Figure 4B:
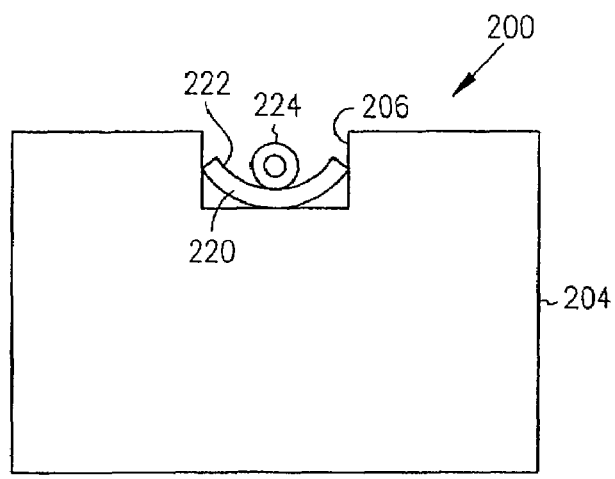
FIG. 4B is a side view illustrating a support device constructed in accordance with another embodiment.

The depression 206 is optionally centered in a top surface 208 of the support structure 204, and comprises a structure which has, in one embodiment, a substantially square or rectangular cross-section (FIG. 4B). In another option, the depression 206 has a cross-section which is semi-circular in shape. Referring to FIGS. 4A and 4B, the support device 200 includes a liner 220 coupled therewith, where, in one option, the liner 220 is plastic. The plastic liner 220 is coupled with the support structure 204 in a number of manners, including, but not limited to, adhesive, or mechanical fastener. The plastic liner 220 is defined in part by a first profile, and the depression 206 is defined in part by a second profile. In one option, as shown in FIG. 4A, the first profile is substantially the same as the second profile. For example, the plastic liner 220 has a semi-circular cross-section and the depression 206 has a semi-circular cross-section. In another option, as shown in FIG. 4B, the first profile is different than the second profile. The plastic liner 220 includes an upper support surface 222, where the upper support surface 222 is adapted to receive and support an elongate structure 224 directly thereon. For instance, elongate piping is slidingly received within the liner 220.

Figure 5A:
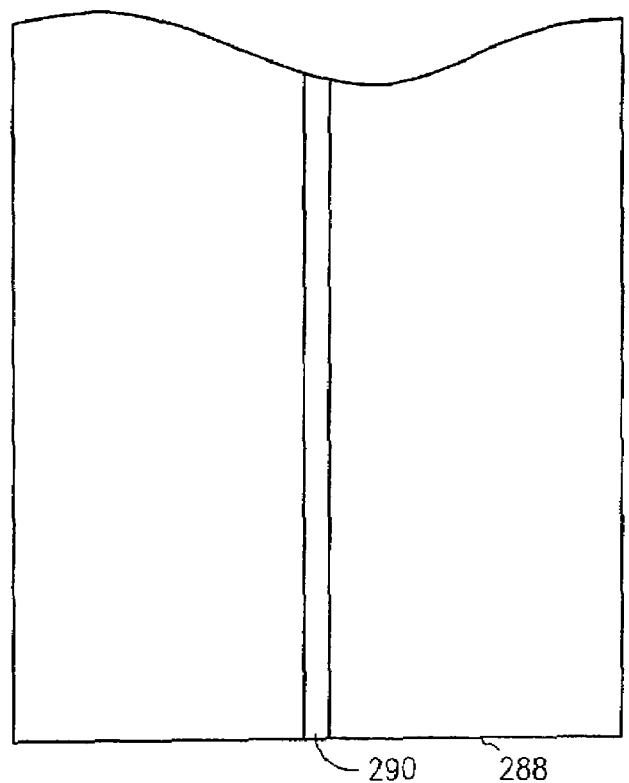
FIG. 5A is a top plan view illustrating a support device constructed in accordance with yet another embodiment.
Figure 5B:
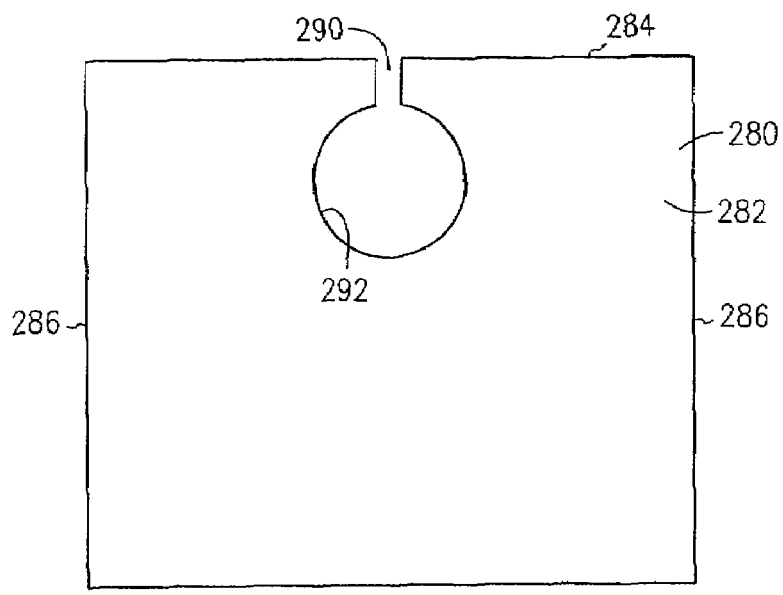
FIG. 5B is a side elevational view illustrating a support device constructed in accordance with another embodiment.

FIGS. 5A and 5B illustrate a support device 280, which is adapted to be installed on a roof structure (FIG. 7), and is adapted to support structures thereon. The support device 280 includes a support structure 282 which is adapted to support the structure.

In one embodiment, the support structure 282 is made of a pliable material, including, but not limited to, a weather resistant, pliable material. In another option, the support structure 282 comprises flame retardant material. The pliable material advantageously provides a visual indicator as to whether the support structure 282 has been consumed. The material has, optionally, a resilience which provides a cushioning effect when compressed. In one embodiment, the support structure 282 comprises a closed cell polyethylene foam material, for example that which is marketed as Dow BK-200.

The support device 280 includes a top surface 284, side surfaces 286, and an end surface 288. Disposed within the top surface 284 of the support device 280 is a slit 290. The slit 290 extends between the top surface 284 and a cut out 292. In one option, the cut out 292 has a circular cross-section and is sized to receive an elongate structure such as piping therein. In another option, the slit 290 comprises an opening, which eases the placement of the structure, such as piping, into the cut out 292.

Figure 6A:
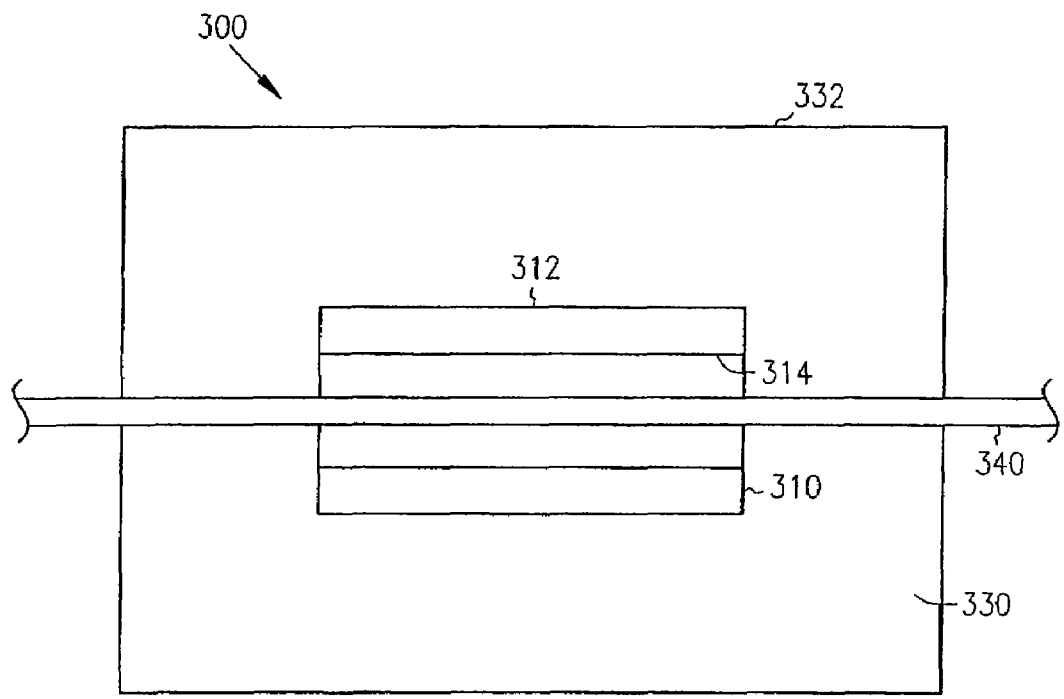
FIG. 6A is a top plan view illustrating a support device constructed in accordance with yet another embodiment.
Figure 6B:
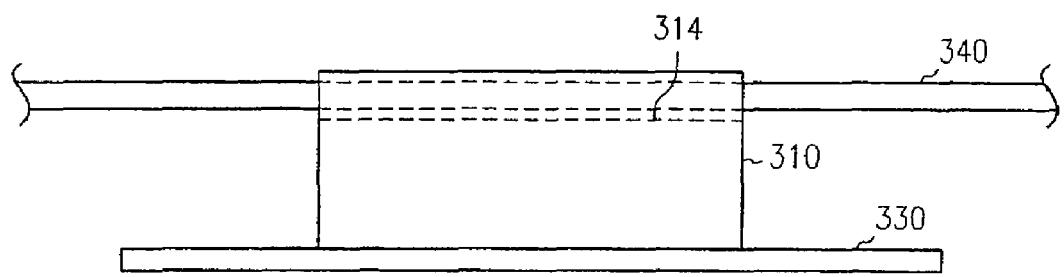
FIG. 6B is a side elevational view illustrating a support device constructed in accordance with one embodiment.

Referring to FIGS. 6A and 6B, a support device 300 is provided which includes a support structure 310 and a plate 330, where the support structure 310 is slidingly received on the plate 330. In one embodiment, the support structure 310 is made of a pliable material, including, but not limited to, a weather resistant, pliable material. The material has, optionally, a resilience which provides a cushioning effect when compressed. In one embodiment, the support structure comprises a closed cell polyethylene foam material, for example that which is marketed as Dow BK-200. The support structure optionally includes a recess therein.

The support structure 310 is defined by a first footprint 312 and the plate 330 is defined by a second footprint 332, where the first footprint 312 is substantially greater than the second footprint 332. The support structure 310 optionally comprises any of the above discussed embodiments. Elongate structures 340, such as piping, are placed directly on the support structure. In another option, the support structure 310 includes a depression 314 therein, where the elongate structures 340 are disposed within the depression 314.

Figure 7:
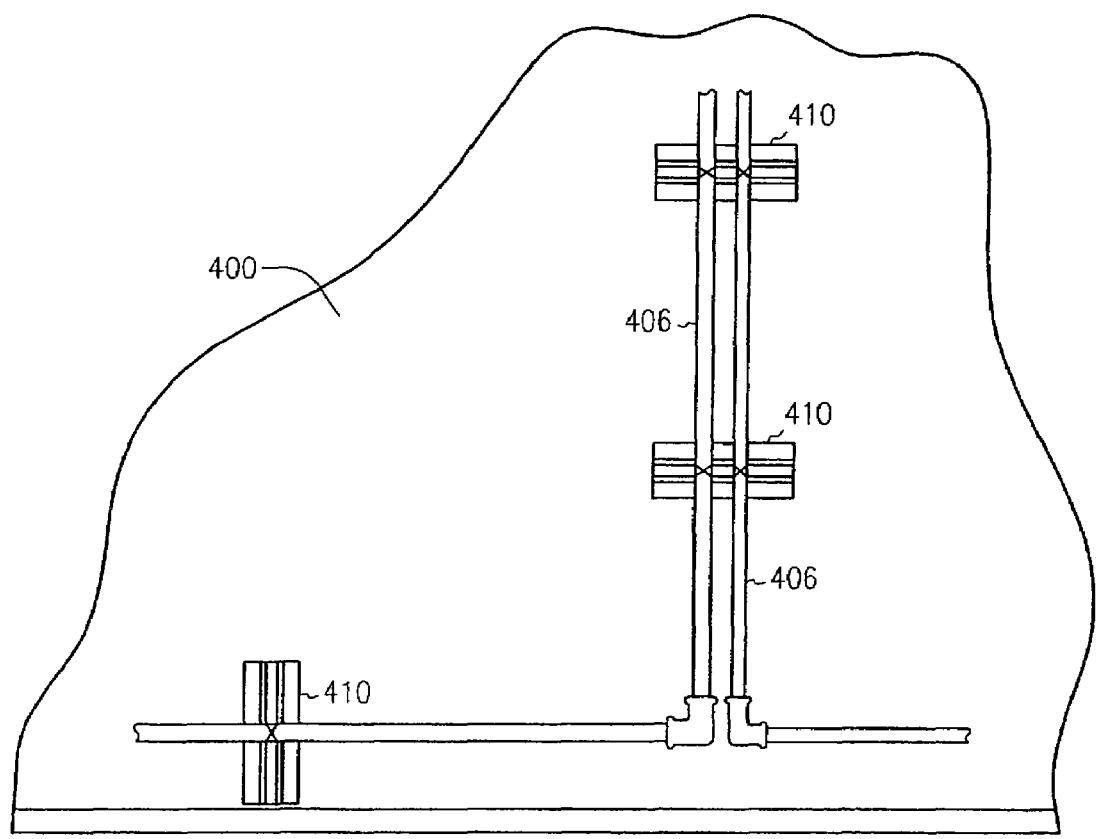
FIG. 7 is a top plan view of a plurality of support devices on a rooftop in accordance with one embodiment.
Figure 8:
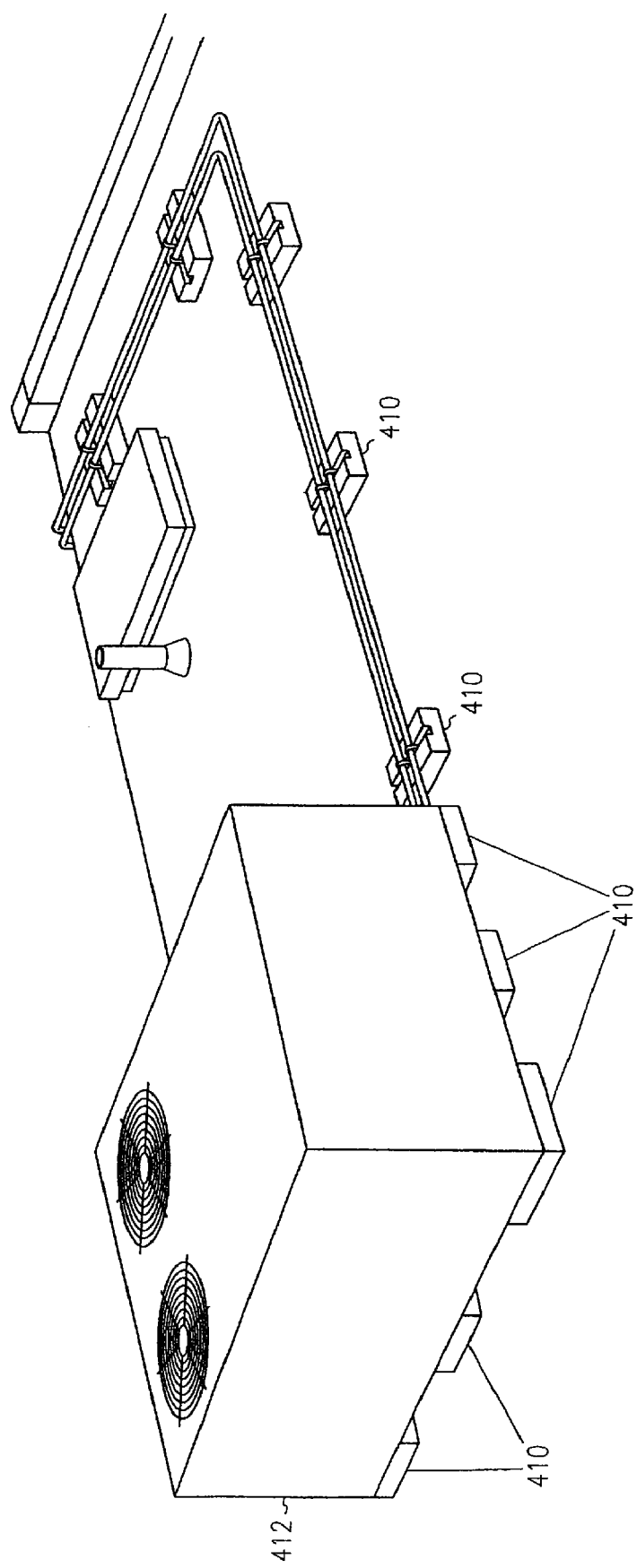
FIG. 8 is a perspective view of a plurality of support devices on a rooftop in accordance with another embodiment.

FIG. 7 illustrates a plurality of support devices 410 installed on a roof 400 of a building. The support devices 410 include any those discussed herein, and shown in the accompanying drawings. Alternatively, the support devices 410 include later developed support devices. The support devices 410 are mounted spaced apart from one another to distribute the weight of the pipes or other elongate structures 406 on the roof 400. Each of the support devices 410 optionally has one or more elongate structures 406, such as pipes, secured thereto to support a system of elongate structures as needed. In another option, as shown in FIG. 8, the support devices 410 are used to support an air conditioning unit 412 on the roof 400.

Figure 9:
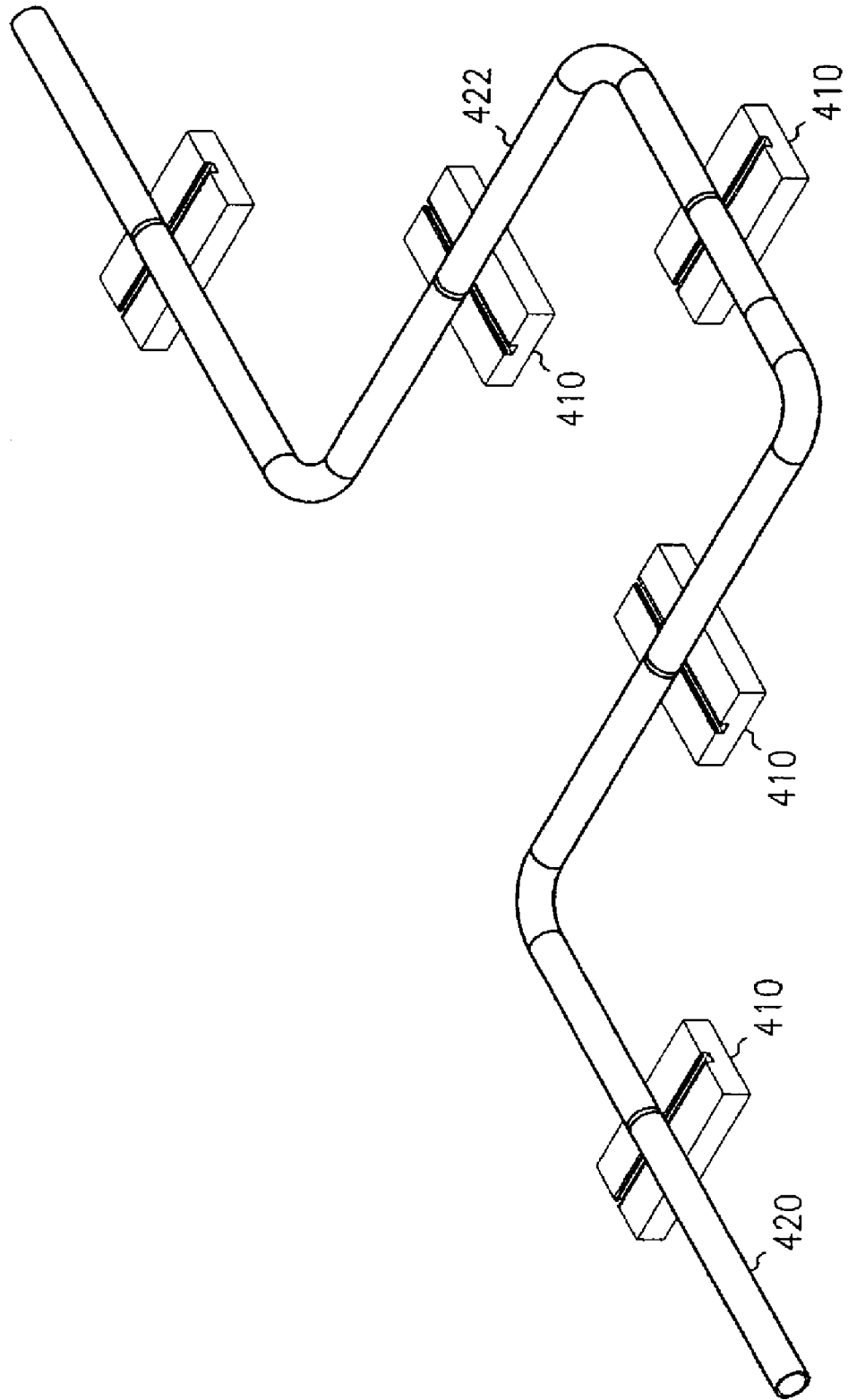
FIG. 9 is a perspective view of a plurality of support devices in accordance with another embodiment.

FIGS. 9-13 illustrate other variations for installations of support devices 410. For instance, as shown in FIG. 9, a plurality of support devices 410 which are placed to support piping 420. The piping 420 includes an expansion loop 422 which allows for the piping 420 to further expand and contract without damage to the piping 420.

Figure 10:
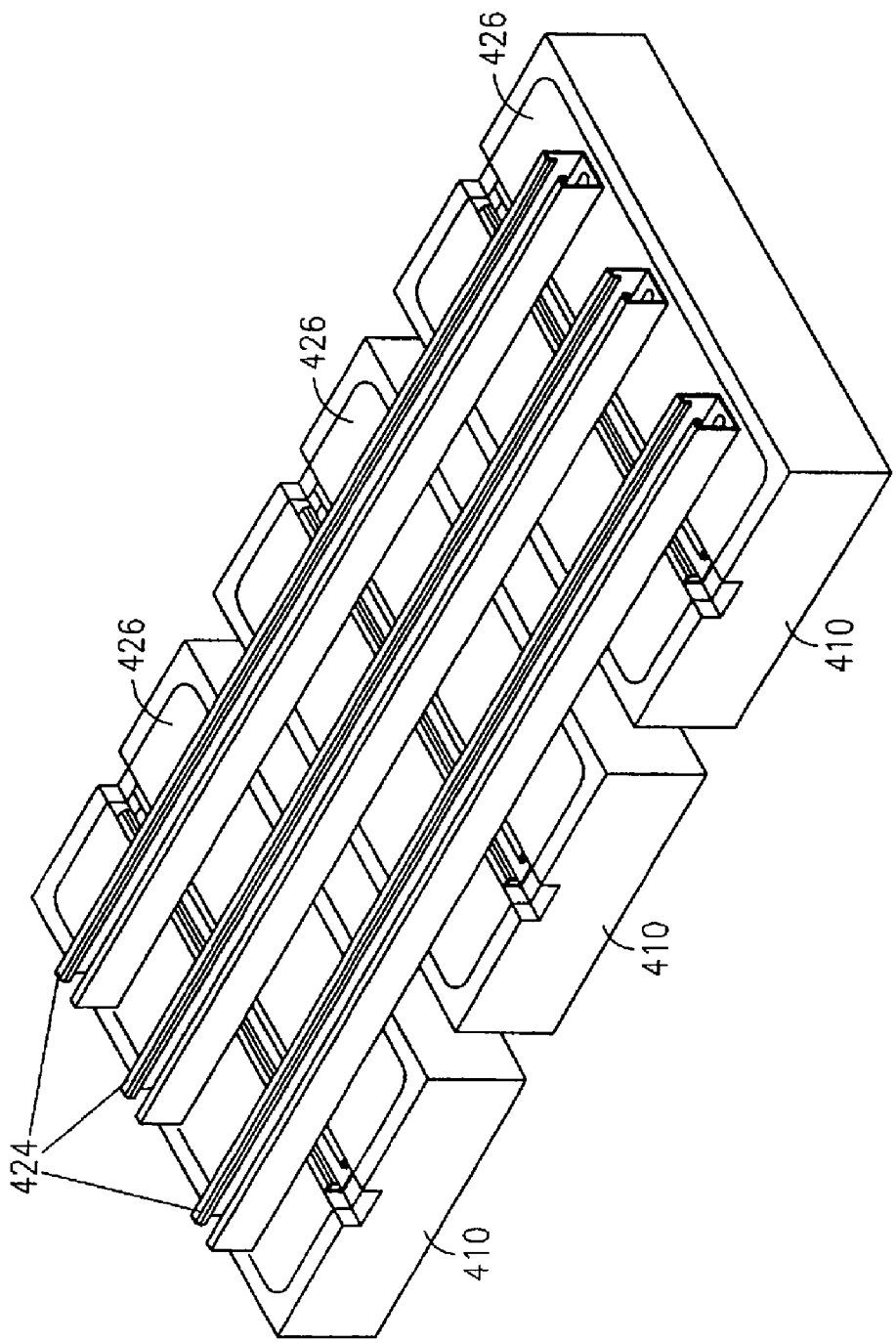
FIG. 10 is a perspective view of a plurality of support devices in accordance with another embodiment.
Figure 11:
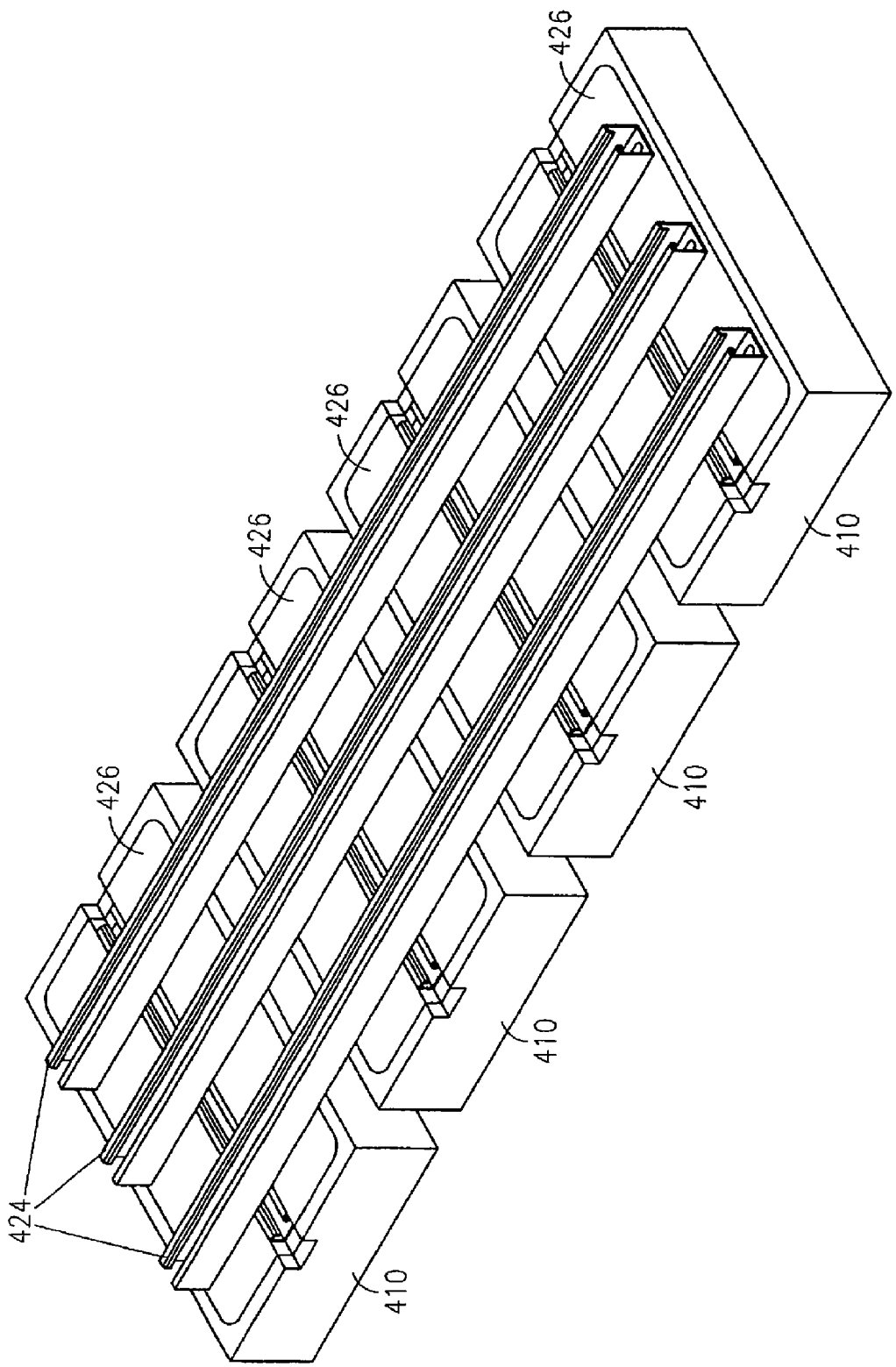
FIG. 11 is a perspective view of a plurality of support devices in accordance with another embodiment.

FIGS. 10 and 11 illustrate other variations for installation of the support devices 410. For installation involving the support of heavier devices, such as air conditioning units, multiple support devices can be placed directly adjacent to one another. For example, three support devices 410 (FIG. 10) or four support devices 410 (FIG. 11) are disposed adjacent to one another. One or more struts 424 are disposed on flat plate structures 426 of the support devices 410. The struts 424 are coupled with the plate structures 426, for example, by welding. Clamps are coupled with the struts 424, and are coupled with the struts 424, and are used to secure elongate structures thereon.

Figure 12:
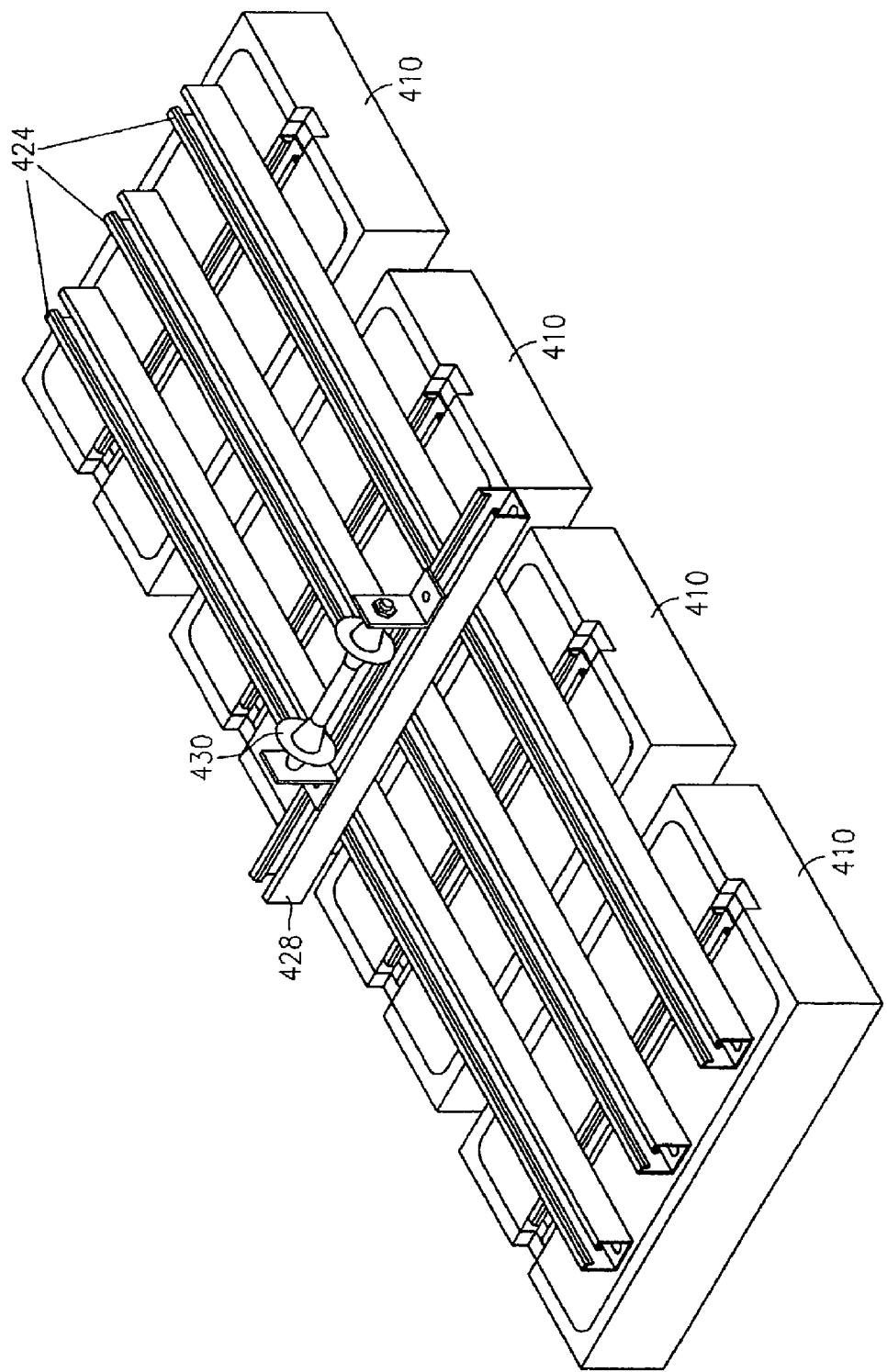
FIG. 12 is a perspective view of a plurality of support devices in accordance with another embodiment.

FIG. 12 illustrates another configuration of support devices 410 which are disposed directly adjacent to one another, or near one another. One or more struts 424 are disposed on the plates 426. Disposed across the struts 424, for example, in a transverse direction to the struts 424, is one or more second set of struts 428. Coupled with the second set of struts 428 is a roller 430, which provides for further diversity in the types of components which can be mounted thereon. In addition, the roller 430 allows for further movement for structures mounted thereon.

The support device 100 further includes elevational assemblies 80, as illustrated in FIGS. 13-16. It should be noted that the elevational assemblies 80 have various formats, and further can be used with the above and below described support devices, or a combination thereof. The elevational assemblies 80 include one or more elevating members 82 such as a vertical member. In one option, the elevating members 82 have a structure that includes one or more of a strut, rod, beam, elongate member with an optional channel, etc.

In one option, the elevational assembly 80 includes structure which allows the height to be adjusted. For example, the elevating members allow for the elongate structure to be mounted at multiple locations along the elevating member. For example, a fastener can be used to secure the elongate member to the elevating member at multiple locations. In another example, multiple apertures are formed in the elevating member, allowing for multiple attachment locations. Alternatively, multiple projections can be disposed along the elevating members 82. The adjustable elevation allows the elongate structure, such as a pipe mounted on a roof or floor surface, to maintain a set elevation while the support device follows the slope of the roof or floor surface. This saves labor and expense of installing elbows around parapets or other obstructions.

Figure 14:
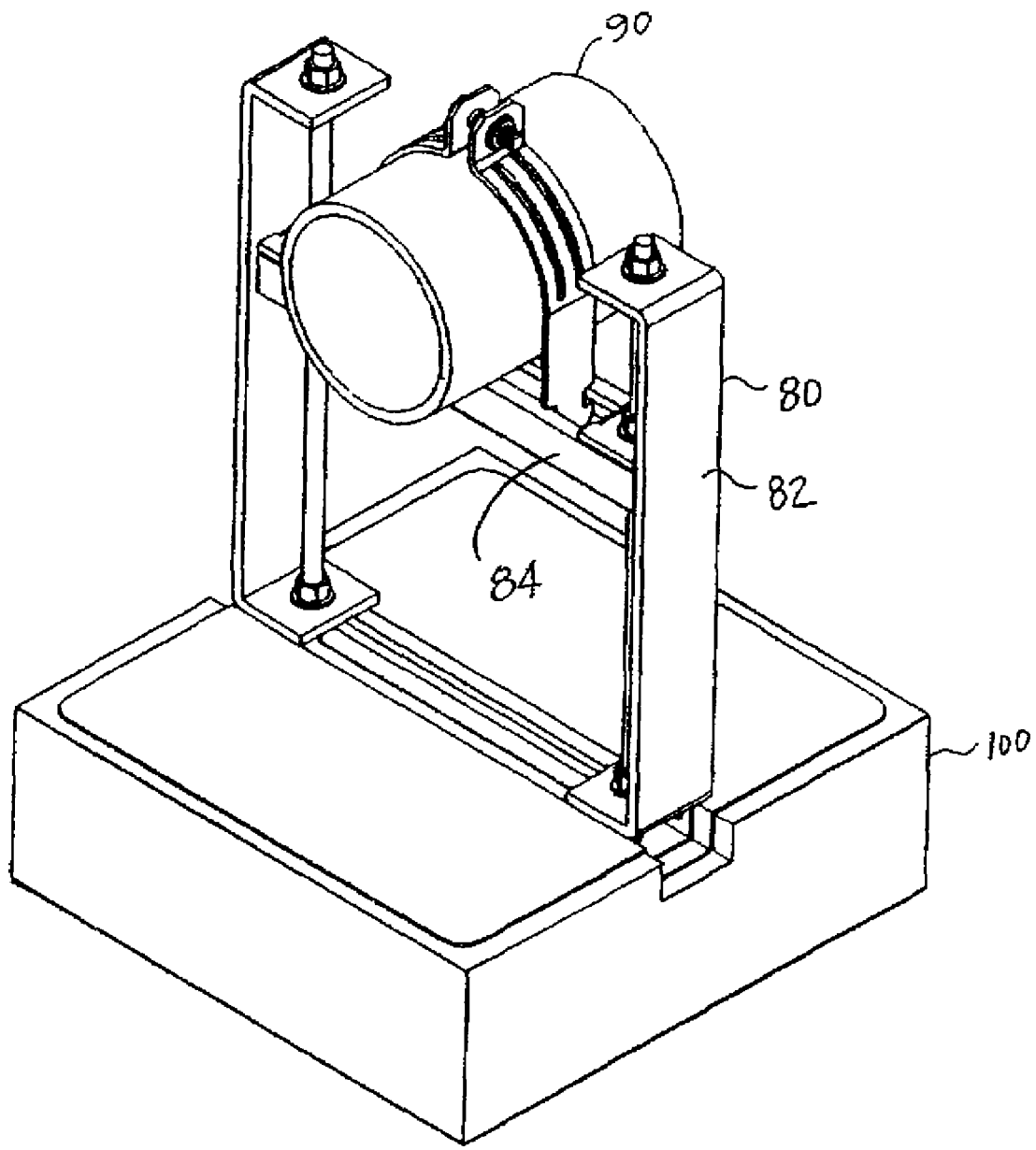
FIG. 14 is a perspective view of a support device in accordance with another embodiment.

In another option, the elevational assemblies 80 further include a support member 84, such as a horizontal member, that supports the elevating members. In one example, the support member is a strut coupled to two or more elevating members by one or more fasteners. Alternatively, the support member and/or the elevating members include integral fastening features such as, but not limited to, interference fit, hook and latch features, apertures, etc. The support member 84 also allows for an elongate structure 90 to be coupled therewith. In one option, the support member 84 is arranged with the elevating members 82, for example as illustrated in FIG. 14, allowing for the elongate structure 90 to be disposed on the support member 84. This arrangement further allows for top loading of the elongate structure 90, where the elongate structure 90, for example, is lowered into the assembly during installation.

Figure 13:
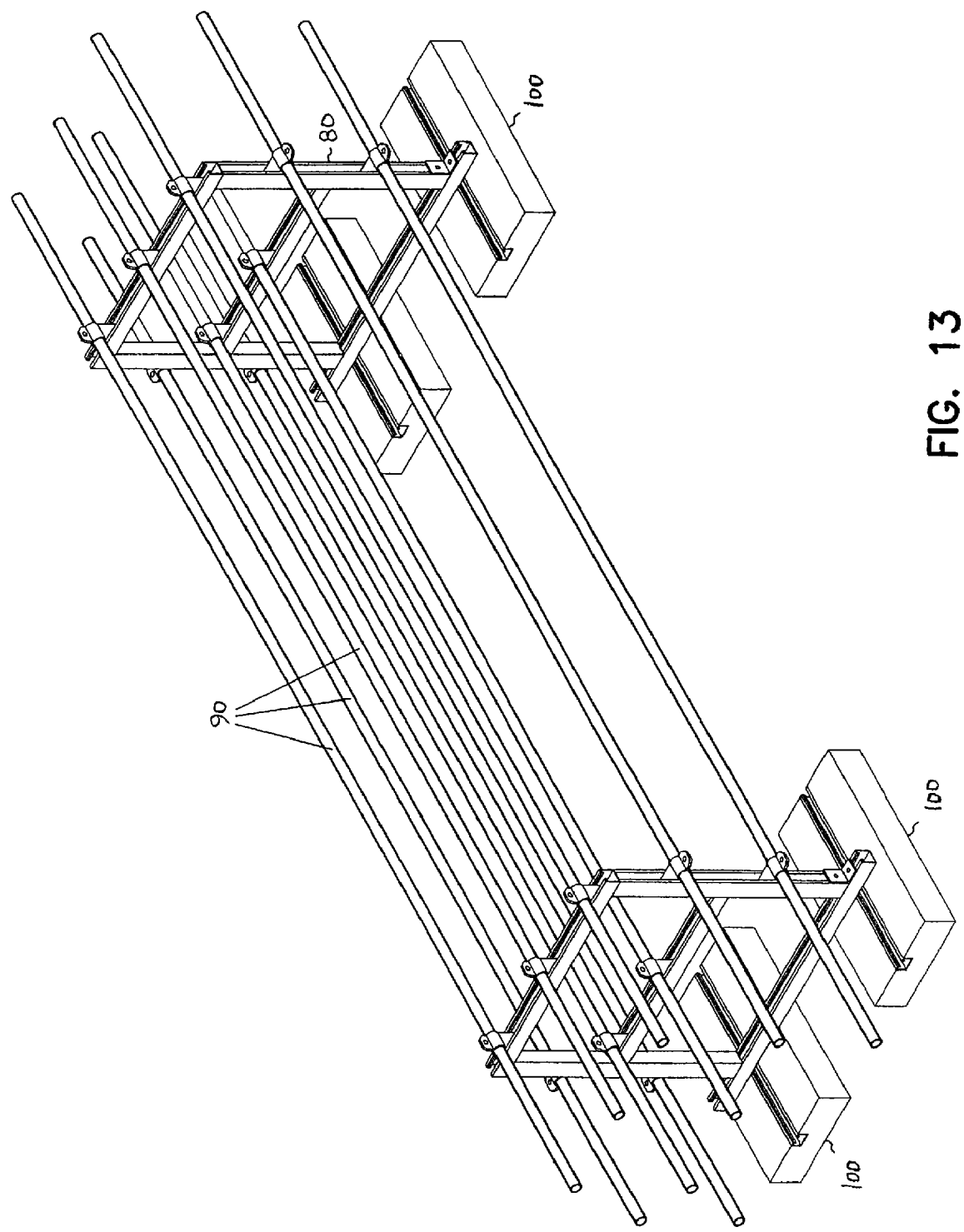
FIG. 13 is a perspective view of a plurality of support devices in accordance with another embodiment.

In one option, the elevational assembly 80 is used with multiple support devices, as illustrated in FIG. 13. In the illustrated example, vertical extension members provide an elevation to the elongate structures 90, allowing the elongate structures 90 to be raised above the support device. The elevational assemblies 80 further allow for multiple elongate structures 90 to be elevated a different heights. This further allows for additional elongate structures 90 to be mounted within a predetermined footprint.

Another example of an elevational assembly is illustrated in FIG. 14. In one option, the elevational assemblies 80 includes a bracket 86 coupled with an elongate member, such as a rod 88. A support member 84 such as a strut 92 is coupled between two rods 88. The shape of the rods 88 allow for the adjustability in height for the elevational assembly 80.

Figure 15:
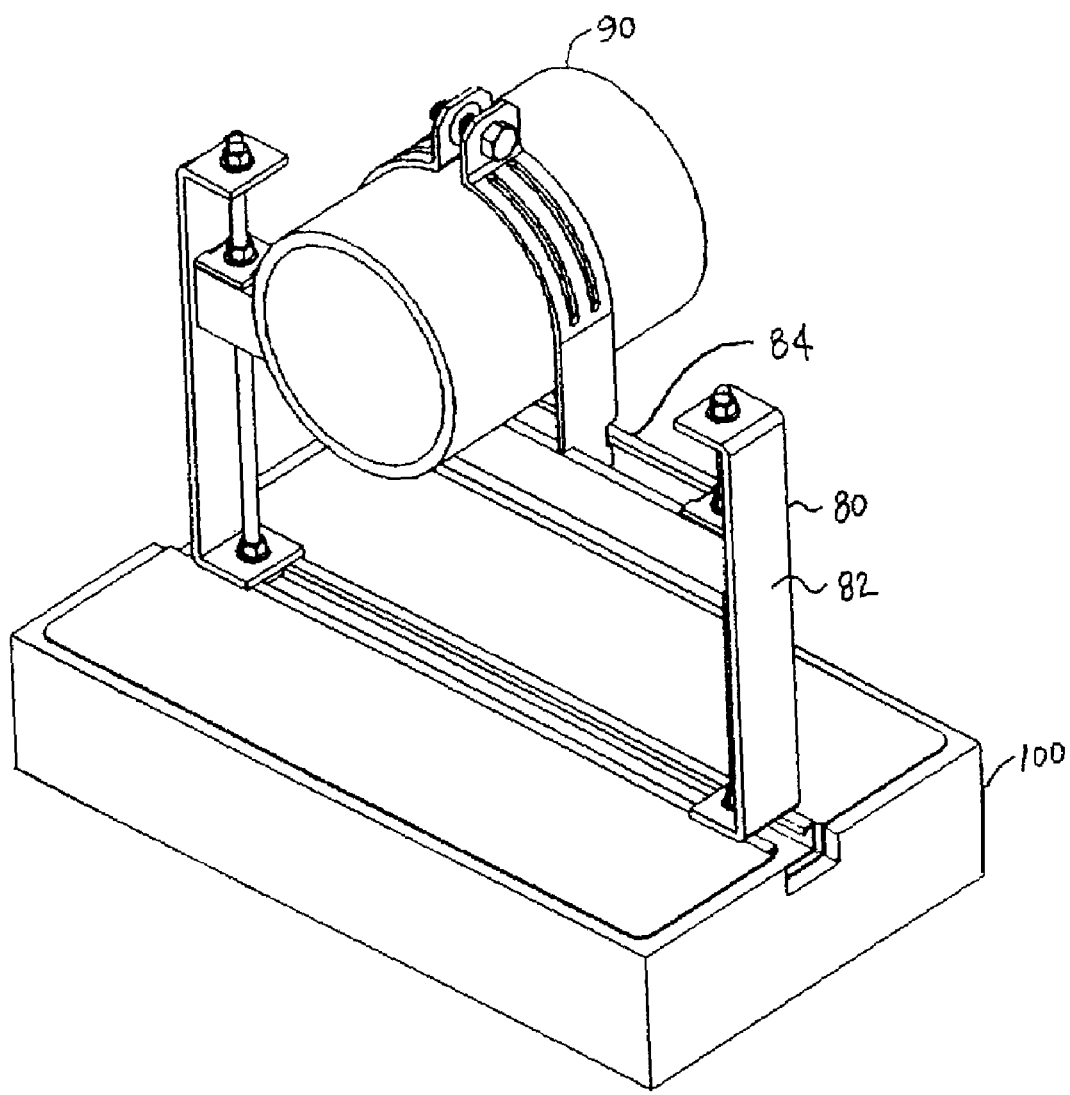
FIG. 15 is a perspective view of a support device in accordance with another embodiment.

FIG. 15 illustrates another example of an elevational assembly 80, where the support device 100 has a different footprint than that of FIG. 14. It should be noted that the elevational assembly 80 can be used with support devices having a variety of footprints.

Figure 16:
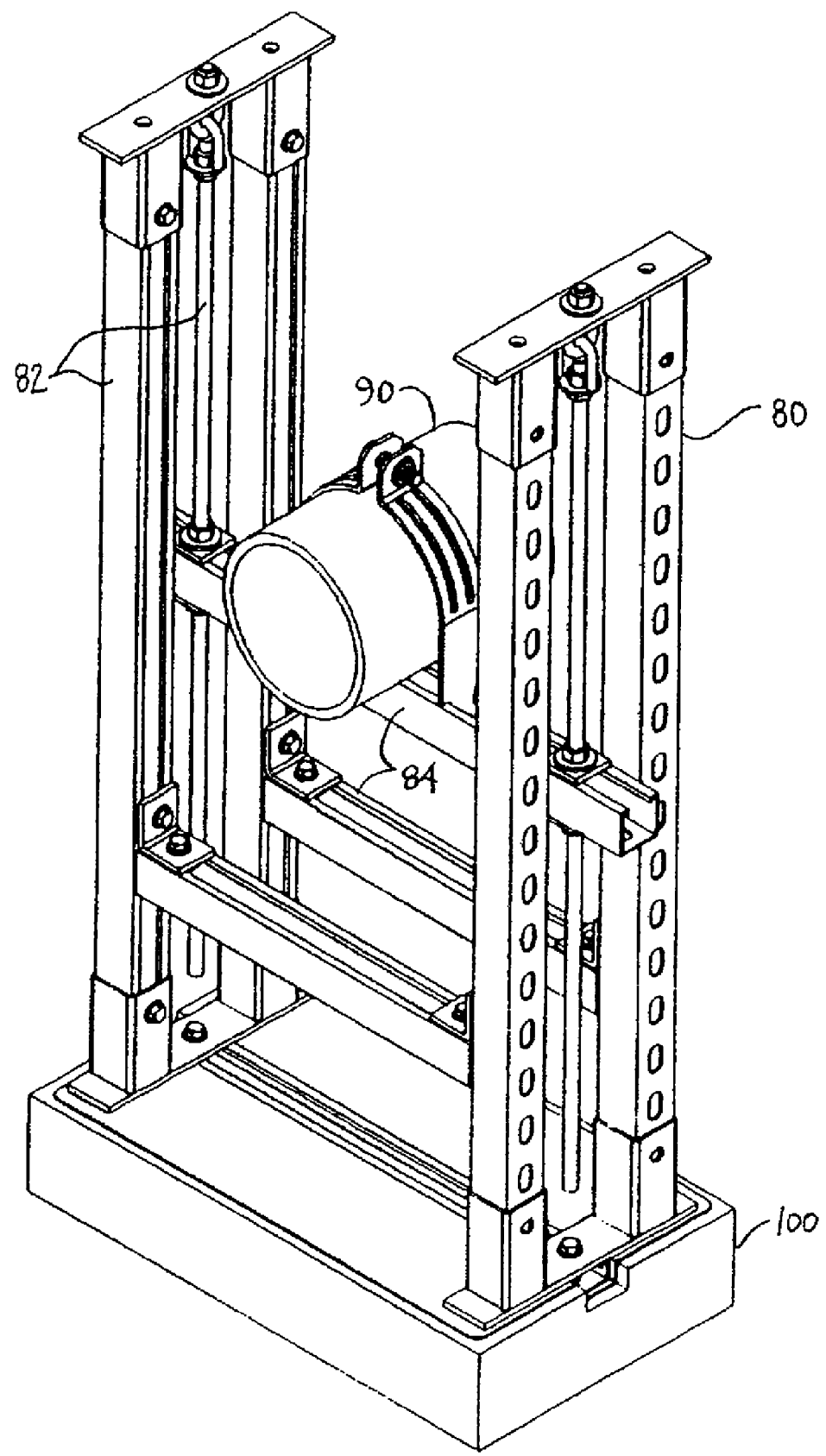
FIG. 16 is a perspective view of a support device in accordance with another embodiment.

FIG. 16 illustrates yet another example of an elevational assembly 80. In the illustrated example, multiple elevating members 82 and multiple support members 84, to achieve even further flexibility in elevation of the elongate structure 90, as well as increased flexibility in the amount of weight that can be mounted on the support structure. In one option, the elongate structure 90 is mounted to a support member 84, for example a strut. The support member 84 is mounted to an elevating member 82. The elevating member 82 is mounted or formed in a manner that allows some flexibility in the mounting of the elongate structure 90. For example, in one option, the elevating member 82 is an elongate rod that is indirectly coupled with the support device at one end of the elongate rod, as illustrated in FIG. 16. In another option, the elongate rod is allowed to swing relative to the support device and/or other elevating members to which it is coupled. For example, the elongate rod is hingedly coupled with a portion of the elevational assembly 90. This allows for the elongate rod to move with the elongate structure 90 as the elongate structure 90 expands and contracts, for example, due to thermal expansion or contraction. This structure will assist in preventing damage to the roof membrane or the elongate structure 90 when the elongate structure 90 expands or contracts. It should be noted that the elongate rod can have other shapes or structures that allow it to move with the growth or contraction of the elongate structure 90.

Figure 17A:
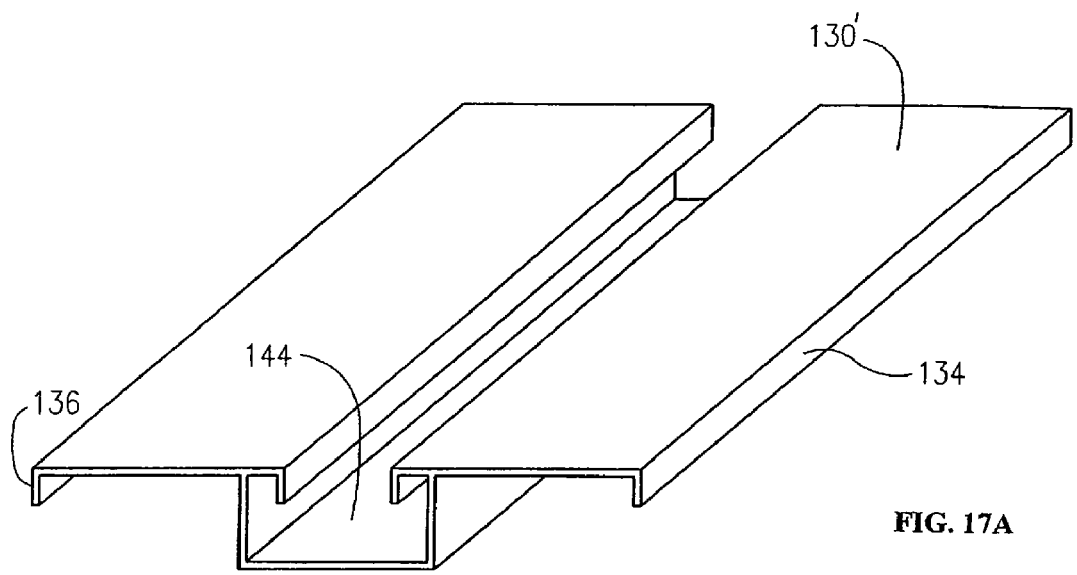
FIG. 17A is a perspective view of a plate structure of a support device in accordance with one embodiment.
Figure 17B:
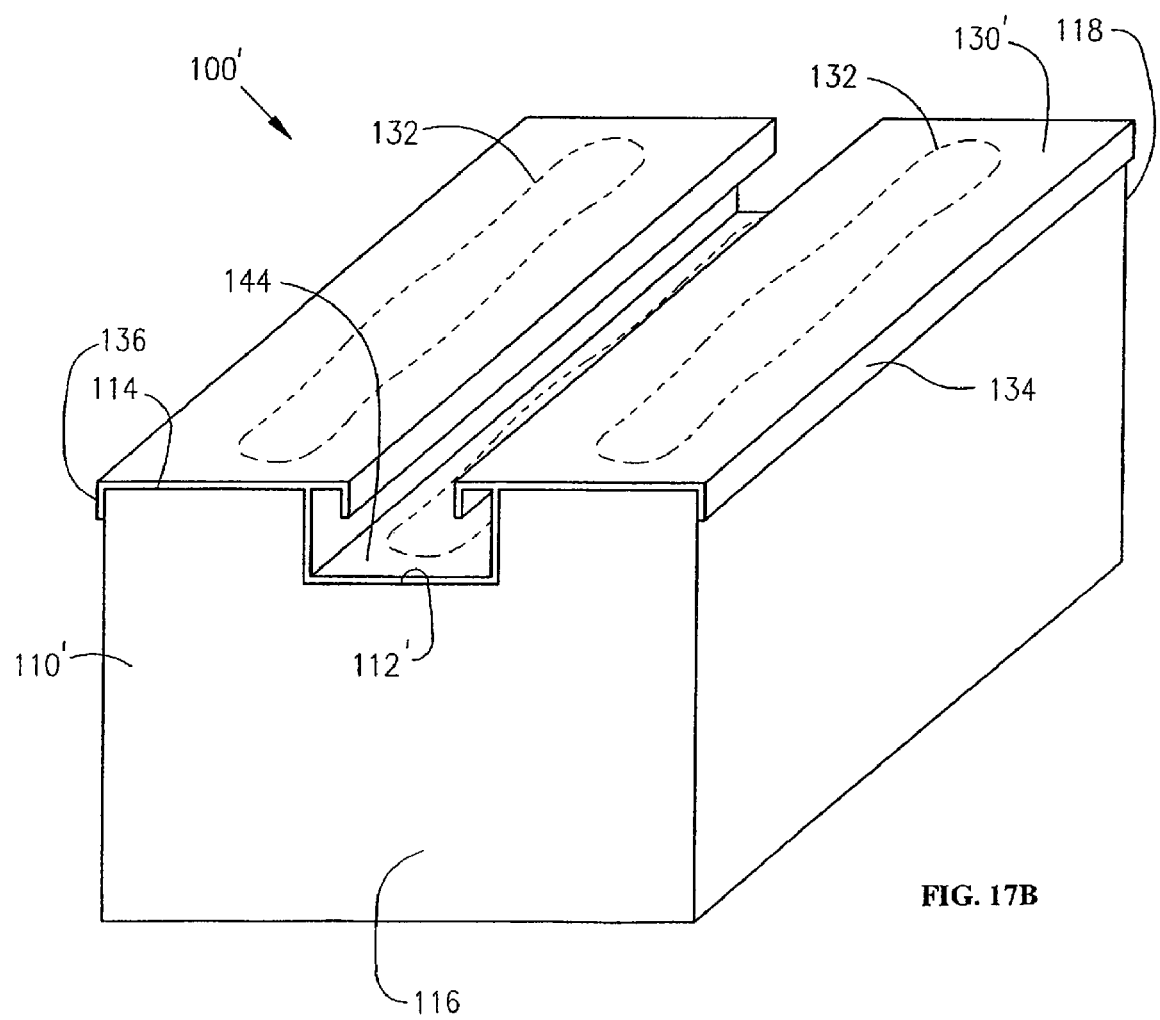
FIG. 17B is a perspective view of a support device in accordance with one embodiment.
Figure 18:
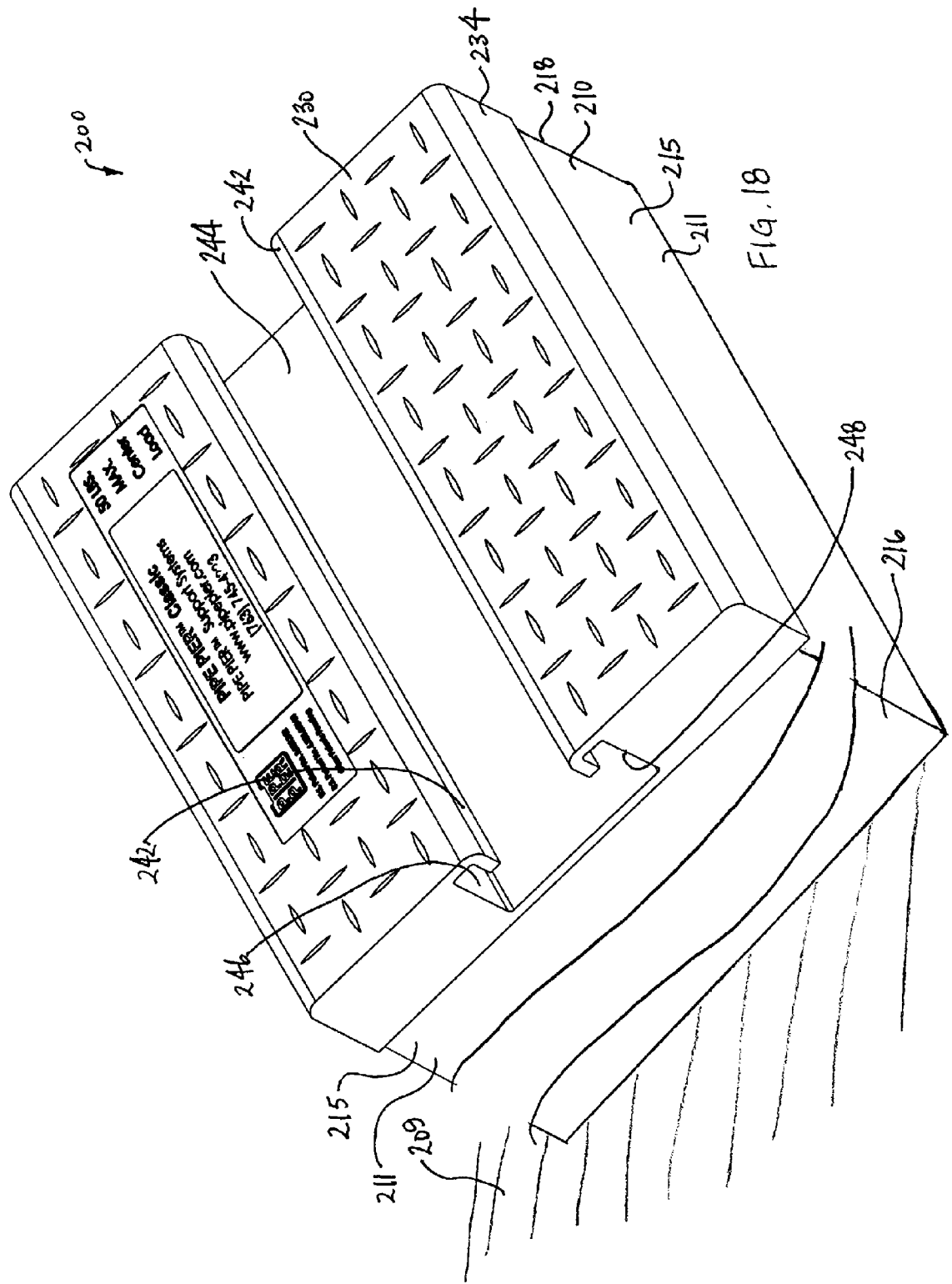
FIG. 18 is a perspective view of a support device in accordance with one embodiment.
Figure 19:
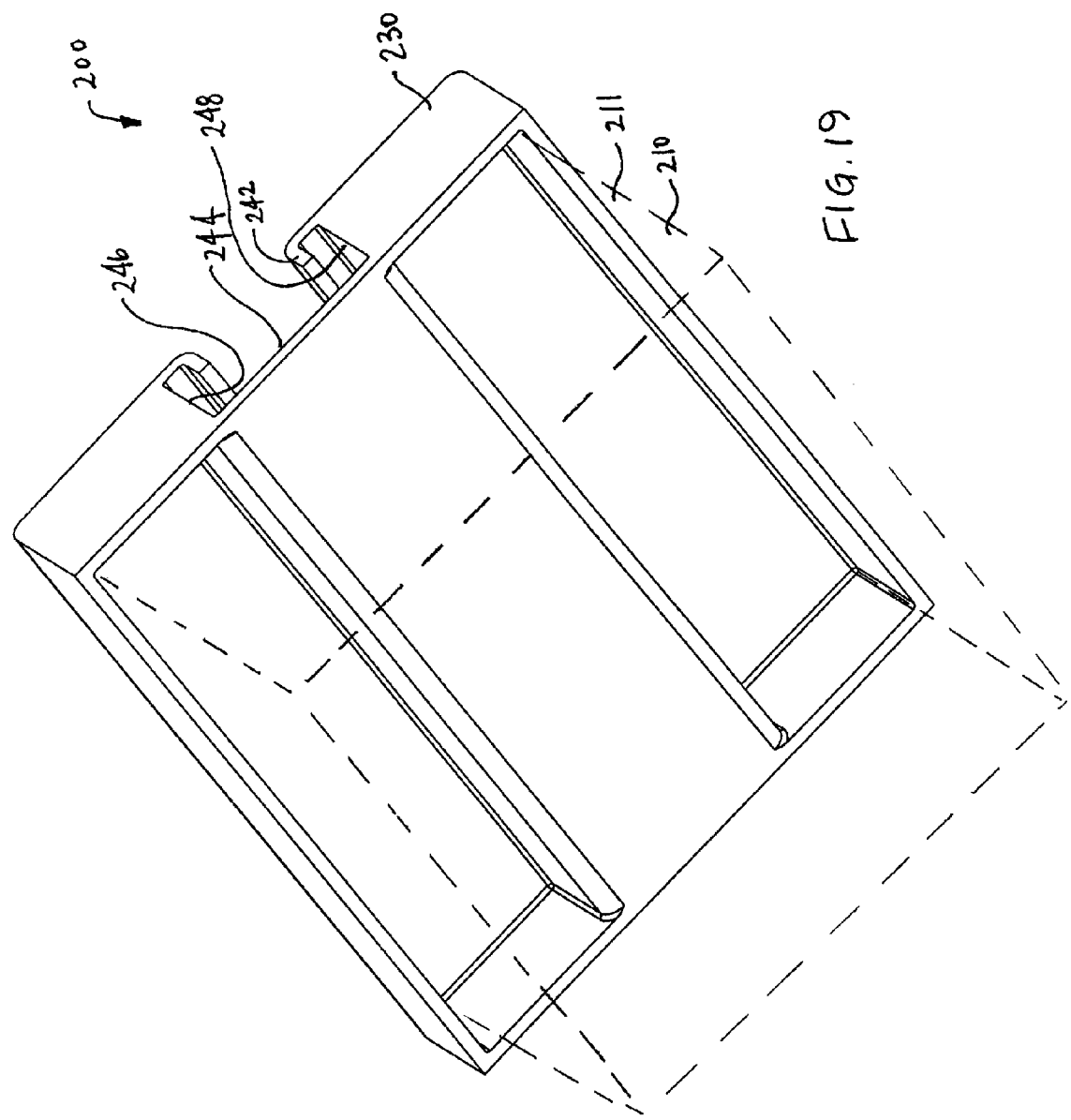
FIG. 19 is a perspective view of a support device in accordance with one embodiment.
Figure 20:
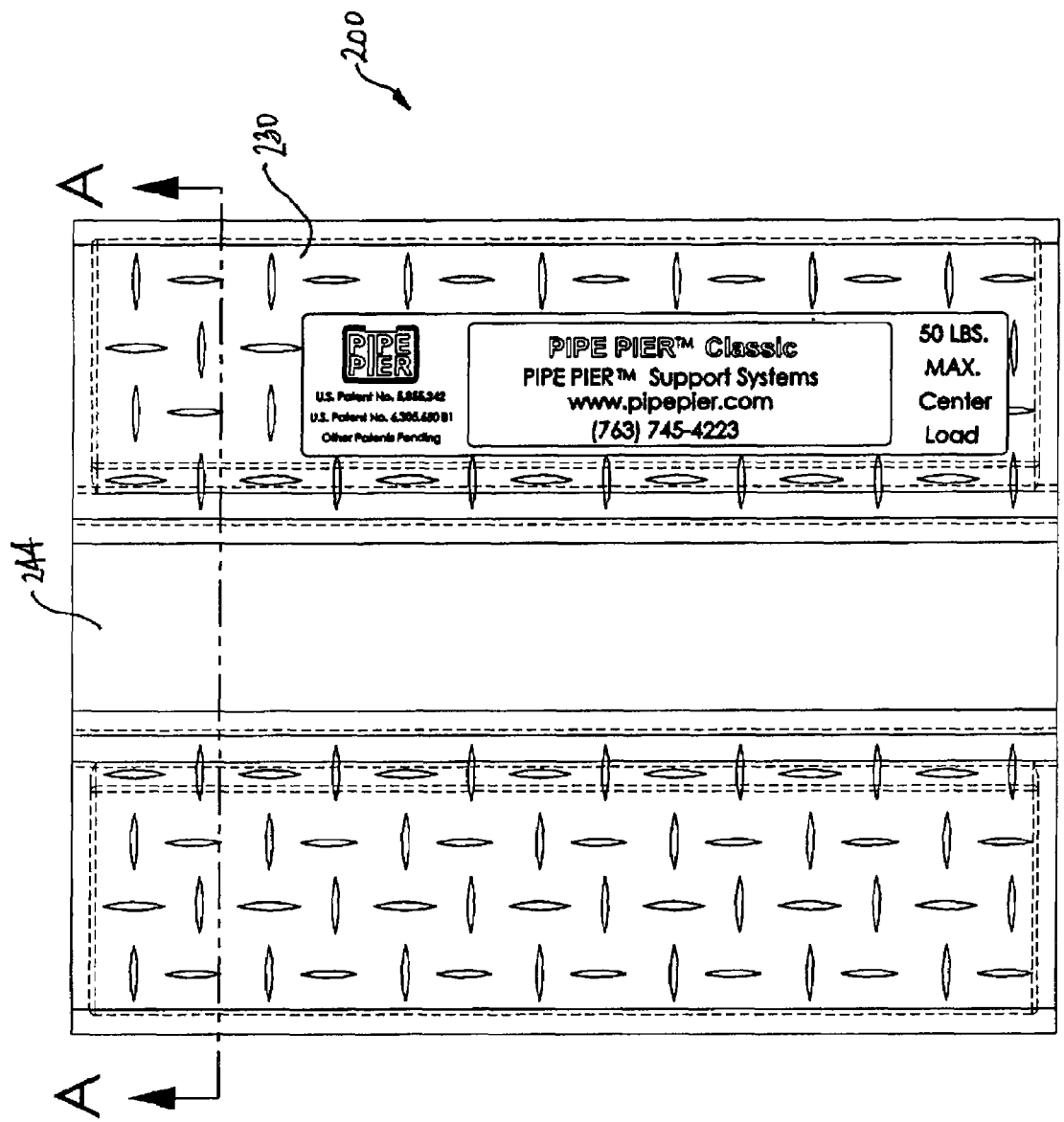
FIG. 20 is a top plan view of a support device in accordance with one embodiment.
Figure 21:
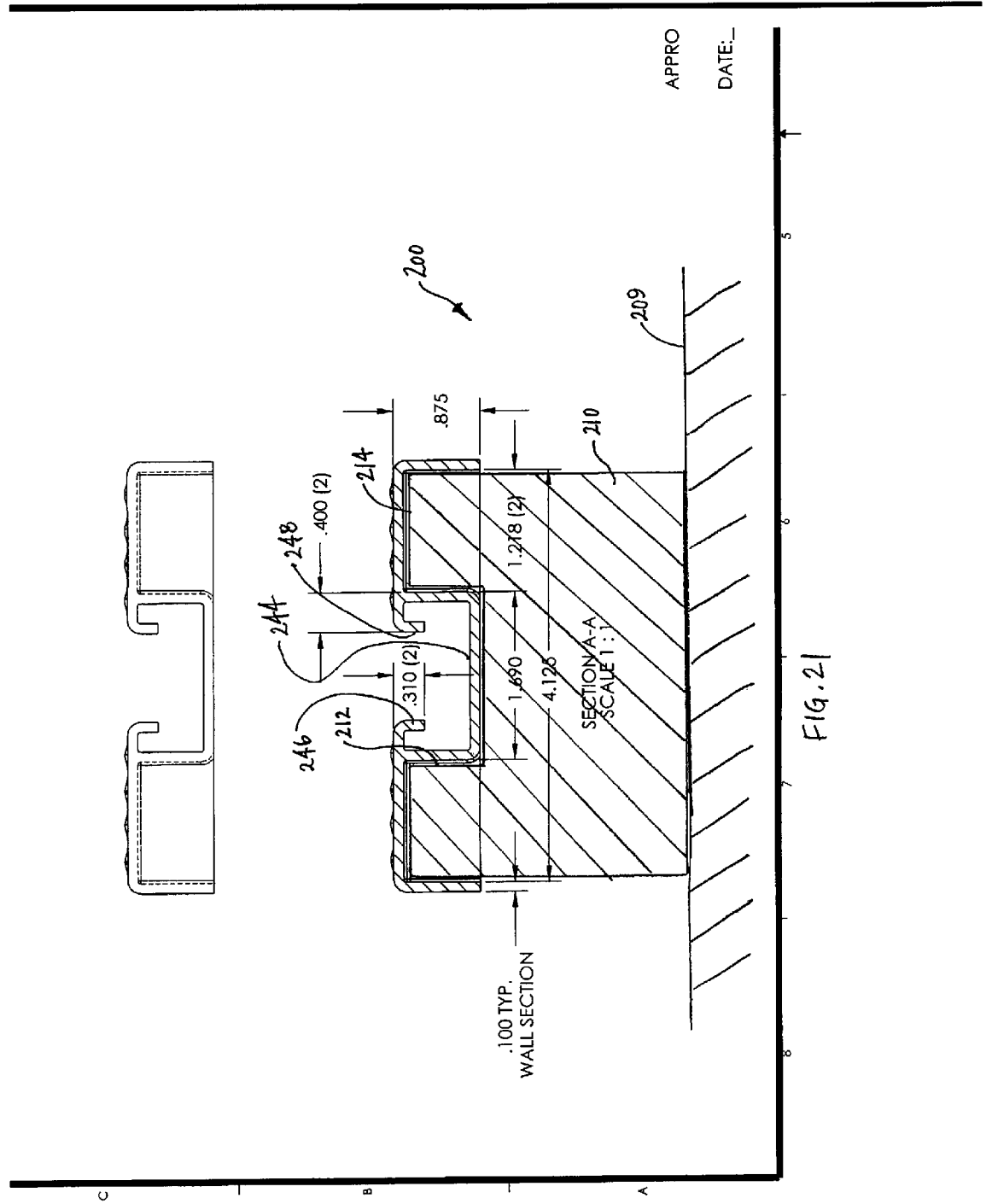
FIG. 21 is a cross-sectional view of a support device taken along A-A of FIG. 20

FIGS. 17A and 17B illustrates perspective views of a support device 100' and a portion of the support device 100'. The support device 100' is adapted to be installed on a roof structure (see for example, FIGS. 7 and 8), and is adapted to support elongate structures, such as piping. In addition, the support device 100' is adapted to support other types of equipment, such as, but not limited to, security cameras, satellite dishes, or air conditioning units. The support device 100' includes a support structure 110' which is adapted to support a plate structure 130' thereon, and, as further discussed below, an elongate strut is included therewith.

In one embodiment, the support structure 110' is made of a pliable material, including, but not limited to, a weather resistant, pliable material. Optionally, the material of support structure 110' is UV resistant, and optionally can be made of two pound foam, or four pound foam. The material has, optionally, a resilience which provides a cushioning effect when compressed. In one embodiment, the support structure 110' comprises a closed cell polyethylene foam material, for example that which is marketed as Dow BK-200. In another embodiment, the support structure 110' comprises a fire retardant foam.

The support structure optionally includes a recess 112'. The recess 112' is optionally centered in a top surface 114 of the support structure 110', and comprises a structure which has, in one embodiment, a substantially square or rectangular cross-section. The support structure 110' extends from a first side 116 to a second side 118. In one option, the recess 112' extends entirely from the first side 116 to the second side 118. It should be noted however that the recess 112' optionally extends only partially from the first side 116 to the second side 118. Disposed on the support structure 110' is a plate structure 130'.

The plate structure 130' comprises a generally flat structure, except as described below. The plate structure 130' is coupled with the support structure 110', in a number of manners, for instance, by adhesive 132 or by a mechanical fastener, such as a screw, threaded component, nail, bolt, clip, or any combination of these. The plate structure 130' is defined in part by a footprint which is optionally substantially the same as a footprint of the support structure. In another option, the plate structure footprint is smaller that the support structure footprint, as discussed in above-discussed embodiments. Alternatively, the plate structure 130' is at least slightly larger than the support structure 110', which assists in protecting the support structure 110' from animals such as birds eating away at the support structure 110'. Furthermore, it also assists in protecting the support structure 110' from exposure to harmful UV rays. In another option, the plate structure 130' includes a first side 134 and a second side 136 that at least partially extend over sides of the support structure 110', one example of which is illustrated in FIG. 17B.

The plate structure 130' optionally further includes a depression 144 therein. The depression 144 of the plate structure 130' is sized and positioned to be disposed, at least partially, within the recess 112' of the support structure 110'. The depression 144 is defined in part by two side edges 146, 148, and in one option forms an elongate coupling member. It should be noted that the elongate coupling member can be associated with the plate structure 130' in other ways. For example, the elongate coupling member can be disposed above the top surface of the plate structure. The depression 134 is optionally deep enough to form a strut therein. Flanges 142 extend adjacent and/or into the depression 142 to further assist in forming a strut-like structure with the depression 142. Members such as clamps are further optionally included, as discussed above. The members such as clamps are adapted to support an elongate structure therein or thereon. The types of clamps which can be used with the support device includes, but is not limited to, pipe claims cable clamps, electrical fittings, saddles, brackets, spring bolts, beam clamps, and roller clamps.

The plate structure 130', in one option, is substantially rigid. In another option, the plate structure 130' is comprised of sheet metal. Other materials for the plate structure 130' include, but not limited to 20 gage sheet metal, 12 gage sheet metal, 14 gage sheet metal, or plastic such as nylon, plexiglass, HDPE, or Teflon. Another material for the plate structure 130' includes a high density ethylene hexene copolymer. The plastic-type of materials assist in reducing the overall weight of the support device.

FIGS. 18-21 illustrate views of a mounting device 200. The mounting device is adapted to be installed on a building structure, such as on a roof of a building, and is adapted to support elongate structures, such as piping. In addition, the mounting device is adapted to support other types of equipment, such as, but not limited to, security cameras, satellite dishes, or air conditioning units. The mounting device includes a support structure 210 that is adapted to support a support plate member 230 thereon.

In an embodiment, the support structure 210 is a pliable base made of a pliable material, including, but not limited to, a weather resistant, pliable material. Optionally, the material of support structure 210 is UV resistant, and optionally can be made of two-pound foam, or four-pound foam. The material has, optionally, a resilience that provides a cushioning effect when compressed. In one embodiment, the support structure 210 comprises a closed cell polyethylene foam material, for example that which is marketed as Dow BK-200. In another embodiment, the support structure 210 comprises fire retardant foam. The support structure 210 is mountable on a building structure, such as a roof top 209, without damage to the building structure.

The support structure 210 is defined by a top portion 214 and outer side surfaces 215. The support structure 210 optionally includes at least one recess 212. The recess 212 is optionally centered in the top portion 214 of the support structure 210, and comprises a structure which has, in one embodiment, a substantially square or rectangular cross-section. The support structure 210 extends from a first side 216 to a second side 218. In one option, the recess 212 extends entirely from the first side 216 to the second side 218. It should be noted however that the recess 212 optionally extends only partially from the first side 216 to the second side 218. Disposed on the support structure 210 is a support plate member 230.

The support plate member 230 includes a portion of a generally flat structure 231, and option includes structure disposed at an angle relative to the flat structure 231. For example, the support plate member 230 includes horizontal and vertical portions. The support plate member 230 is coupled with the support structure 210, in a number of manners, for instance, by adhesive or by a mechanical fastener, such as a screw, threaded component, nail, bolt, clip, or any combination of these. Other methods for coupling the support plate member 230 with the support structure 210 include, but are not limited to, bonding, welding, interference fit, or gravity.

The support plate member 230 is defined in part by a footprint, which is optionally substantially the same as a footprint of the support structure. In another option, the support plate member footprint is smaller that the support structure footprint, as discussed in above-discussed embodiments. Alternatively, the support plate member 230 is at least slightly larger than the support structure 210, which assists in protecting the support structure 210 from animals such as birds eating away at the support structure 210, among other things. Furthermore, it also assists in protecting the support structure 210 from exposure to harmful UV rays. In another option, the support plate member 230 includes a first side 234 that at least partially extend over sides of the support structure 210, and optionally is disposed directly adjacent to a surface of the support structure 210, such as an outer side surface 211 of the support structure 210. In another option, a portion of the support plate member 230 is disposed directly adjacent two or more outer sides surfaces 211 of the support structure 210, or optionally disposed directly adjacent a perimeter side surface of the support structure. In yet another option, the support plate member 230 is disposed directly adjacent a top portion 214 of the support structure 210.

The support plate member 230 optionally further includes a depression 244 therein. The depression 244 of the support plate member 230 is sized and positioned to be disposed, at least partially, within the recess 212 of the support structure 210. The depression 244 is defined in part by two side edges 246, 248, and in one option forms an elongate coupling member, such as a strut integral with the support plate member 230. It should be noted that the elongate coupling member can be associated with the support plate member 230 in other ways. For example, the elongate coupling member can be disposed above the top surface of the support plate member. The depression 244 is optionally deep enough to form a strut therein. Flanges 242 extend adjacent and/or into the depression 244 to further assist in forming a strut-like structure with the depression 242. Members such as clamps are further optionally included, as discussed above. The members such as clamps are adapted to support an elongate structure therein or thereon. The types of clamps which can be used with the support device includes, but is not limited to, pipe claims cable clamps, electrical fittings, saddles, brackets, spring bolts, beam clamps, and roller clamps.

The support plate member 230, in one option, is substantially rigid. In another option, the support plate member 230 is comprised of sheet metal. Other materials for the support plate member 230 include, but not limited to 20 gage sheet metal, 22 gage sheet metal, 24 gage sheet metal, or plastic such as nylon, plexiglass, HDPE, or Teflon, or a molded or extruded product. Another material for the support plate member 230 includes a high density ethylene hexene copolymer. The plastic-type of materials assist in reducing the overall weight of the support device.

The support device can be used as a roof mounting system. Alternatively, the mounting system can be employed in a variety of mounting applications, including internal mounting or attic mounting. The mounting system can be used for a number of different pluming, electrical, and duct mounting applications. Further options include differing the dimensions of the base. Further optimal configurations include various clamps in conjunction with a variety of support structure materials.

Advantageously, the support device is adapted to support elongate structures which are more heavy than ordinary elongate structures. A further benefit is that the support structure provides a visual indicator if the support structure needs to be replaced. The support structure allows for elongate structures to be mounted on slightly irregular surfaces, and is durable and resilient to harsh weather conditions. Further, the support device provides lateral mounting flexibility and support for the elongate structures, and the elongate structures are allowed to freely change position without damaging the mounting surface, such as a rooftop membrane.

It is to be understood that the above description is intended to be illustrative, and not restrictive. It should be noted that features of the various above-described embodiments may be interchanged to form additional combinations. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A mounting apparatus for supporting building components on a rooftop, the apparatus comprising:
    a pliable foam base defined in part by a top portion and outer side portions, the top portion defining a recess that extends across the top portion of the pliable foam base, the pliable foam base mountable on the rooftop to conform to irregular surfaces on the rooftop;
    a rigid support plate coupled to the top portion of the foam base, with an underside portion of the support plate member disposed directly adjacent to the pliable foam base, wherein a portion of the support plate member that is disposed directly adjacent to the pliable base is disposed directly adjacent to at least one outer side portion of the outer side portions of the pliable foam based,
    wherein the rigid support plate defines a strut shaped depression that extends across the rigid support plate, the rigid support plate including flanges to mount to a clamp, wherein the portion of the rigid support plate that defines the depression extends away from the underside of the rigid support plate and is disposed in the recess of the pliable foam base.

2. The mounting structure as recited in claim 1, wherein the portion of the support plate member is disposed directly adjacent two or more outer sides of the pliable base.

3. The mounting structure as recited in claim 1, wherein the portion of the support plate member surrounds an outer perimeter of the pliable base.

4. The mounting structure as recited in claim 1, wherein the support plate member includes vertical and horizontal portions.

5. The mounting structure as recited in claim 1, wherein the mounting apparatus includes elongate structure mounted thereon.

6. The apparatus of claim 1, wherein the pliable foam base is weather resistant.

7. A mounting apparatus for supporting building components on a rooftop, comprising:
    a pliable foam base defined in part by a top portion and outer side portions, the top portion defining a recess that extends across the top portion of the pliable foam base, the pliable foam base mountable on a building structure to conform to irregular surfaces on the building structure;
    a substantially rigid support plate member, with a portion of a support plate member disposed directly adjacent to the pliable base, the support plate member defined by an underside portion of the support plate member that is disposed on the top portion of the pliable foam base and directly adjacent to at least one outer side portion of the pliable base, wherein the rigid support plate member defines a depression that extends across the rigid support plate member, and wherein the portion of the rigid support plate member that defines the depression extends away from the underside of the rigid support plate member and is disposed in the recess of the pliable foam base; and
    at least one strut disposed in the depression of the substantially rigid support plate member, the strut including flanges that extend into an interior portion of the strut, the strut opening away from the top portion of the pliable foam base.

8. The mounting device as recited in claim 7, wherein a portion of the rigid support plate member is coupled directly to the pliable base.

9. The mounting device as recited in claim 8, wherein the rigid support plate member is adhered to the pliable base.

10. The mounting device as recited in claim 7, wherein the rigid support plate member includes at least one recessed portion therein, the recessed portion defining an inner side wall portion.

11. The mounting device as recited in claim 7, wherein the pliable base is received within the recessed portion.

12. The mounting device as recited in claim 7, wherein the pliable base is disposed adjacent to the inner side wall portion.

13. The mounting device as recited in claim 7, wherein the at least one strut is coupled with the substantially rigid support plate member.

14. The mounting structure as recited in claim 7, wherein the portion of the support plate member is disposed directly adjacent two or more sides of the pliable base.

15. The mounting structure as recited in claim 7, wherein the portion of the support plate member surrounds an outer perimeter of the pliable base.

* * * * *